(12) United States Patent
Fernandez et al.

(10) Patent No.: US 6,785,673 B1
(45) Date of Patent: Aug. 31, 2004

(54) METHOD FOR CONVERTING RELATIONAL DATA INTO XML

(75) Inventors: Maria F. Fernandez, Madison, NJ (US); Atsuyuki Morishima, Tsukuba (JP); Dan Suciu, Seattle, WA (US); Wang-Chiew Tan, Philadelphia, PA (US)

(73) Assignee: AT&T Corp., New York, NY (US)

( * ) Notice: Subject to any disclaimer, the term of this patent is extended or adjusted under 35 U.S.C. 154(b) by 171 days.

(21) Appl. No.: 10/029,211

(22) Filed: Dec. 28, 2001

Related U.S. Application Data

(63) Continuation-in-part of application No. 09/778,749, filed on Feb. 8, 2001, now Pat. No. 6,604,100.
(60) Provisional application No. 60/260,708, filed on Jan. 10, 2001, and provisional application No. 60/181,400, filed on Feb. 9, 2000.

(51) Int. Cl.$^7$ .............................................. G06F 17/30
(52) U.S. Cl. .......................................... 707/3; 707/513
(58) Field of Search ............................... 707/1, 2, 3, 4, 707/5, 6, 7, 8, 9, 10, 100, 101, 102, 103, 200, 201, 500, 513; 715/513

(56) References Cited

U.S. PATENT DOCUMENTS 6,012,067 A * 1/2000 Sarkar .................... 707/103 R
6,199,195 B1 * 3/2001 Goodwin et al. ............ 717/104
6,263,332 B1    7/2001 Nasr et al. ...................... 707/5
6,343,287 B1    1/2002 Kumar et al. ................... 707/4
6,356,920 B1 * 3/2002 Vandersluis ............... 715/501.1
6,366,934 B1    4/2002 Cheng et al. ................ 715/513
6,604,100 B1 * 8/2003 Fernandez et al. ............. 707/3

OTHER PUBLICATIONS

"Relational Database for Querying XML Documents: Limitations and Opportunities", by J. Shanmugasundaram et al., 25$^{th}$ VLDB Conference, Edinburgh, Scotland, 1999, 13 pages.

"Storing Semistructured Data with STORED", by Alin Deutsch et al., In SIGMOD '99, pp. 431–442, 1999.

* cited by examiner

*Primary Examiner*—Diane D. Mizrahi
*Assistant Examiner*—Yicun Wu

(57) ABSTRACT

A method for converting relational data to XML (eXtensible Markup Language) is provided. The method can use a greedy algorithm to efficiently construct materialized XML views of relational databases. A greedy algorithm designed for XML view definition queries is provided for decomposing a large query into smaller queries and determining which query will run faster without actually running the query.

29 Claims, 9 Drawing Sheets

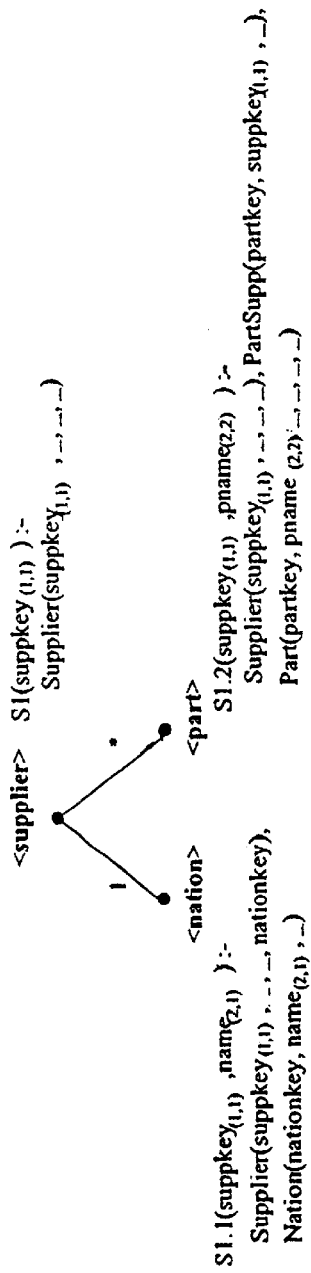

FIG. 7

| $L_1$ | $suppkey_{(1,1)}$ |
|---|---|
| 1 | supp#1 |
| 1 | supp#2 |
| 1 | supp#3 |

Plan (d), node <supplier>

| $L_1$ | $L_2$ | $suppkey_{(1,1)}$ | $name_{(2,1)}$ |
|---|---|---|---|
| 1 | 1 | supp#1 | USA |
| 1 | 1 | supp#2 | Spain |
| 1 | 1 | supp#3 | France |

Plan (b), edge <supplier>–<nation>;
plan (c), node <nation>;
plan (d), node <nation>.

| $L_1$ | $L_2$ | $suppkey_{(1,1)}$ | $pname_{(2,2)}$ |
|---|---|---|---|
| 1 | 2 | supp#1 | plated brass |
| 1 | 2 | supp#1 | anodized steel |
| 1 | 2 | supp#3 | polished nickel |

Plan (b), node <part>; plan (d), node <part>.

| $L_1$ | $L_2$ | $suppkey_{(1,1)}$ | $pname_{(2,2)}$ |
|---|---|---|---|
| 1 | 2 | supp#1 | plated brass |
| 1 | 2 | supp#1 | anodized steel |
| 1 | 2 | supp#2 | |
| 1 | 2 | supp#3 | polished nickel |

Plan (c), edge <supplier>–<part>.

Total (query + data transfer) time    Query-only time

Total (query + data transfer) time    Query-only time

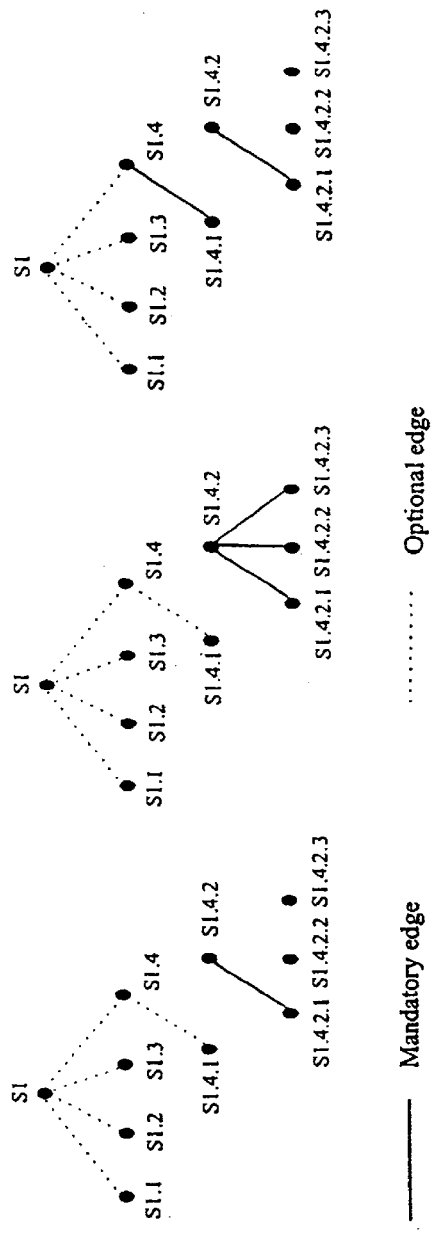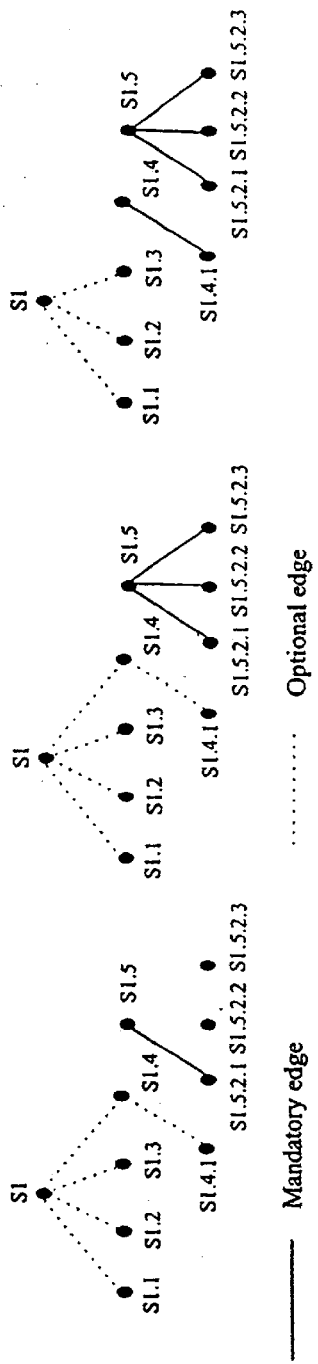

METHOD FOR CONVERTING RELATIONAL DATA INTO XML

CROSS-REFERENCE TO RELATED APPLICATIONS

This application claims priority under 35 USC § 119(e) to U.S. provisional patent application serial No. 60/260,708, filed on Jan. 10, 2001, which is herein incorporated by reference and this application is a continuation in-part of U.S. patent application Ser. No. 09/778,749, filed on Feb. 8, 2001, now U.S. Pat. No. 6,604,100 which is herein incorporated by reference, and which claims priority to Provisional application No. 60/181,400 filed on Feb. 9, 2000.

FIELD OF THE INVENTION

The present invention relates to the field of data exchange between applications on a distributed network. More particularly, the present invention relates to converting relational data into XML (eXtensible Markup Language) on the Internet.

BACKGROUND OF THE INVENTION

XML (eXtensible Markup Language) can serve many purposes. XML is a more expressive markup language than HTML (Hyper-Text Markup Language). XML may be an object-serialization format for distributed object applications. XML serves as the standard format for data exchange between inter-enterprise applications on the Internet and in particular, the World Wide Web ("Web"). In data exchange, XML documents are generated from persistent data and then sent over a network to an application. To facilitate data exchange, numerous industry groups, such as healthcare and telecommunications groups, have been defining public document type definitions (DTDs) and XML Schemas (generically, XML schemas) that specify the format of the XML data to be exchanged between their applications. The aim is to use XML as a "lingua franca" for data exchange between inter-enterprise applications. XML can make it possible for data to be exchanged regardless of the platform on which it is stored or the data model in which it is represented. When received by a target application, XML data can be re-mapped into the application's data structure or target database system. Thus, XML can serve as a language for defining a view of non-XML data.

Most data is stored in relational or object-relational database management systems (RDBMS) or in legacy formats. To realize the full potential of XML, tools are needed that can automatically convert the vast stores of relational data into XML. Such tools should be general, dynamic, and efficient.

Relational data is tabular, flat, normalized, and its schema is proprietary, which makes it unsuitable for direct exchange. In contrast, XML data is nested and un-normalized, and its XML schema is public. Thus, the mapping from relational data to an XML view is often complex, and a conversion tool should be general enough to express complex mappings. Existing commercial systems are not general, because they map each relational database schema into a fixed, canonical XML schema. This approach is limited, because no public XML schema will match exactly a proprietary relational schema. In addition, it is often desirable to map one relational source into multiple XML documents, each of which conforms to a different DTD. Hence, a second step is required to transform the data from its canonical form in XML into its final XML form.

Also, the tools need to be dynamic, i.e., only the fragment of the XML document needed by the application should be materialized. In database terminology, the XML view should be virtual. The application typically specifies in a query what data item(s) it needs from the XML document. Typically, these items are a small fraction of the entire data. Some commercial products allow users to export relational data into XML by writing scripts. However, these tools are not dynamic. Rather, they are general because the entire document is generated all at once.

Finally, to be efficient, such tools should exploit fully the underlying query engine of RDBMS whenever data items in the XML view need to be materialized. Query processors for native XML data are still immature and do not have the performance of highly optimized RDBMS engines.

Several commercial tools for exporting relational data into XML views exist today. The ODBC2XML, a product of Intelligent Systems Research (www.intsysr.com) tool allows users to define XML documents with embedded SQL statements, which permit the users to construct an XML view of the relational data. Such views are materialized, however, and cannot be further queried with an XML query language. Alternatively, Oracle's XSQL tool defines a fixed, canonical mapping of the relational data into an XML document, by mapping each relation and attribute name to an XML tag and tuples as nested elements. Such a view could be kept virtual, but this approach is not general enough to support mapping into an arbitrary XML format. IBM's DB2 XML Extender provides a Data Access Definition (DAD) language that supports both composition of relational data in XML and decomposition of XML data into relational tables. DAD's composition feature supports generation of arbitrary XML from relational data. However, the criteria for grouping elements is implicit in the DAD and DAD specifications cannot be nested arbitrarily. More significantly, XML Extender does not support query composition. The Microsoft SQL Server 2000 provides four modes for exporting relational data in XML. Raw mode exports relational tables using a canonical mapping, similar to the technique used in Oracle. Auto mode derives each element name from the relational table and column names. Directives indicate whether column values should appear in XML attributes or elements. In explicit mode, the user constructs a tagged, universal relation that contains the content for the entire document. Each tuple in the result relation is tagged with integers that specify the appropriate nesting level. Explicit mode is completely general and efficient, but it requires the user to construct the universal relation by hand. SQL Server also supports "XML views", which is a technique similar to DAD's RDB mode, but which is dynamic. The elements and attributes in XML templates are annotated with the names of the relational values from which they are derived. The technique is not wholly general, because it does not support arbitrary join conditions in the definition of elements. SQL Server's XML views do qualify as dynamic, because they permit querying of the XML view using XPath. As a user-query language, Xpath supports selection of elements, but not projection or restructuring as does XML-QL.

SUMMARY OF THE INVENTION

The present invention overcomes many of the shortcomings of the prior art. In addition, the present invention addresses the problem of automating the conversion of relational data into XML. According to the invention, a general, dynamic, and efficient tool for viewing and querying relational data in XML referred to as SilkRoute is provided. SilkRoute is general, because it can express mappings of relational data into XML that conform to arbitrary XML schemas, not just a canonical mapping of the relational schema. The mappings may be referred to as views. Applications can express the data they need as an XML-QL query over the view. SilkRoute is dynamic, because it can materialize the fragment of an XML view needed by an application, and Silkroute is efficient, because it can fully exploit the underlying RDBMS (Relational DataBase Management Systems) query engine whenever data items in an XML view need to be materialized.

According to one aspect of the present invention, a general framework is provided for mapping relational databases to XML views, to be used in data exchange. In another aspect of the invention, a new query language, RXL, for mapping relational sources to XML views, is provided. According to yet another aspect, the present invention provides a sound and complete query composition algorithm that, when given an RXL query and an XML-QL query, generates a new RXL query equivalent to their composition. In a still further aspect of the present invention, a technique is provided in which most of the work of an RXL query can be shipped to the underlying database engine.

In another aspect of the invention, an algorithm is provided for efficiently constructing materialized XML views of relational databases. In another aspect of the invention, an XML view can be specified by a query in a declarative query language of a middleware system. According to another aspect of the present invention, an algorithm designed for XML view-definition queries is provided for decomposing a large query into smaller queries. According to a further aspect of the invention, a middleware system can evaluate a query by sending one or more SQL queries to a target relational database, integrating the resulting tuple streams, and adding XML tags. In still a further aspect of the invention, a view-definition query algorithm of the present invention may be implemented in RDBMS engines that generate XML internally.

A query language according to another aspect of the present invention, can be adapted for operation with a variety of systems. For example, the query language can express the transformations expressible in existing XML publishing tools, such as those provided by relational database systems. For example, the IBM DB2 XML Extender provides a Data Access Definition (DAD) language, Microsoft SQL Server has an XML view-definition module, and the Oracle XML SQL Utility exports relational data in a fixed, canonical XML view. In another aspect of the present invention, an intermediate representation of XML view queries called a view tree has been created that is general enough to express the XML mappings in any of these systems. An illustrative algorithm of the invention takes a view tree as input, and therefore could be directly applied to the XML view definitions expressed by these tools.

Although the invention has been defined using the appended claims, these claims are exemplary and limiting to the extent that the invention is meant to include one or more elements from the apparatuses described herein in any combination or sub-combination. Accordingly, there are any number of alternative combinations for defining the invention that incorporate one or more elements from the specification (including drawings, claims, etc.) in any combinations or sub-combinations.

BRIEF DESCRIPTION OF THE DRAWINGS

The present invention will now be described in more detail with reference to preferred embodiments of the invention, given only by way of example, and illustrated in the accompanying drawings in which:

FIG. 3 depicts a view query for an illustrative simplified RXL query according to the present invention.

FIG. 4 depicts illustrative execution plans for a splitting a view tree into connected components according to the present invention.

FIG. 7 depicts partitioned relations for execution plans in FIG. 4 according to an illustrative implementation of the present invention.

FIGS. 14(a)–(c) show the generated plans for when the greedy, plan-generation algorithm is applied to Query 1 according to an illustrative implementation of the present invention.

FIGS. 15(a)–(c) show the generated plans for when the greedy, plan-generation algorithm is applied to Query 2 according to an illustrative implementation of the present invention.

DETAILED DESCRIPTION

Figure 1:
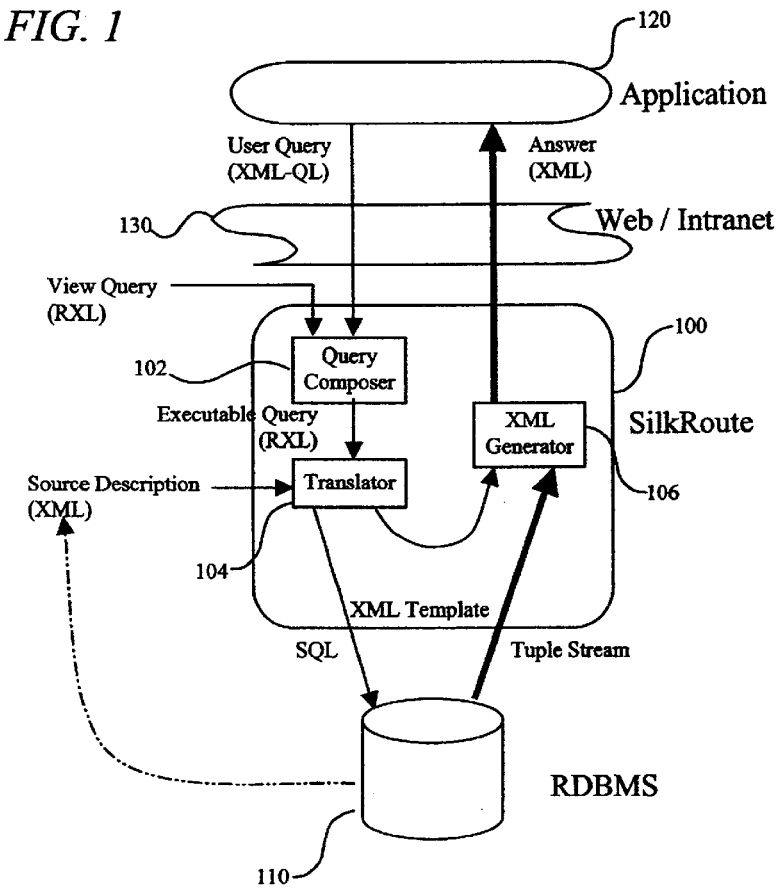
FIG. 1 shows an illustrative architecture of SilkRoute according to the present invention.

The present invention includes SilkRoute, a general, dynamic, and efficient tool for viewing and querying relational data in XML. SilkRoute is a particular instance of a mediator system, as defined by Geo Wiederhold in "Mediators in the Architecture of Future Information Systems" IEEE Computer, pages 38–49, March 1992. In SilkRoute, data can be exported into XML in two steps. First, an XML view of the relational database may be defined using a declarative query language, called RXL (Relational to XML Transformation Language). The resulting XML view can be virtual. Second, some other application formulates a query over the virtual view, extracting some piece of XML data. For this purpose, an existing XML query language, XML-QL, may be used. Either the result of the RXL view or the result of that XML-QL query may be materialized.

The core of SilkRoute is RXL, a powerful, declarative data-transformation language from flat relations to XML data. On the relational side, RXL has much of the power of SQL queries and can express joins, selection conditions, aggregates, and nested queries. On the XML side, RXL has the full power of XML-QL, and can generate XML data with complex structure and with arbitrary levels of nesting. It can also specify arbitrary grouping criteria, using nested queries and Skolem functions. Typical RXL queries are long and complex, because they express general transformations from the relational store to the XML view. RXL has a block structure to help users organize, structure, and maintain large queries.

Once the virtual XML view is defined, SilkRoute accepts XML-QL user queries and composes them automatically with the RXL query. The result of the composition is another RXL query, which can extract that fragment of the relational data that the user requested. In existing relational databases, composition can be straightforward and not considered a problem. For example, Ramakrishnan and Gehrke, in "Database Management Systems" McGraw-Hill, 2nd ed. 1999, describe how to reformulate SQL queries over SQL virtual views as SQL queries over base relations. For XML, however, this problem is more complex. The present invention provides a sound, complete, and conceptually simple algorithm that when given an RXL query and an XML-QL query, produces a new RXL query equivalent to their composition. Some restrictions can be placed on aggregate functions in RXL queries, but they can be used freely in XML-QL queries.

When an RXL query is evaluated, the underlying relational engine does most of the processing. To attain this result, the RXL query can be split into a collection of SQL queries, each of which produces a set of tuples. The SQL queries can be sent to the RDBMS, and their flat, sorted results can be merged in a single pass to construct the nested XML output.

An illustrative implementation of the present invention in electronic commerce, in which suppliers provide product information to resellers, will be described. For their mutual benefit, suppliers and resellers can agree to exchange data in a format that conforms to a particular DTD. An illustrative DTD of XML data exported by suppliers to resellers, supplier.dtd, is shown below.

```
<?xml encoding = "US-ASCII"?>
<!ELEMENT supplier          (company, product*)>
<!ELEMENT product           (name, category, description, retail,
                             sale?, report*)>
<!ATTLIST product           ID ID>
<!ELEMENT company           (#PCDATA)>
<!ELEMENT name              (#PCDATA)>
<!ELEMENT retail            (#PCDATA)>
<!ELEMENT sale              (#PCDATA)>
<!ELEMENT report            (#PCDATA)>
<!ATTLIST report code       (size|defective|style) #REQUIRED>
```

The above code includes the supplier's name and a list of available products. Each product element includes an item name, a category name, a brief description, a retail price, an optional sale price, and zero or more trouble reports. The content of a retail or sale element typically is a currency value. A trouble report includes a code attribute, indicating the class of problem; the report's content may be the customer's comments. Most importantly, this DTD can be used by suppliers and resellers, and it can be a public document.

Consider now a particular supplier whose business data is organized according to the relational schema. An illustrative schema of a supplier's relational database (* denotes key) is depicted in the code below.

```
Clothing(*pid, item, category, description, price, cost)
    SalePrice(*pid, price)
    Problems(pid, code, comments)
```

The Clothing table contains tuples with a product id (the table's key), an item name, category name, item description, price, and cost. The SalePrice table contains sale prices and has key field pid and the Problem table contains trouble codes of products and their reports. The above code shows a third-normal form relational schema, designed for the supplier's particular business needs. The schema can be proprietary. For example, the supplier may not want to reveal the attribute cost in Clothing. The supplier's task is to convert its relational data into a valid XML view conforming to the DTD and make the XML view available to resellers. In this example, it is assumed that the supplier exports a subset of its inventory, in particular, its stock of winter outerwear that it wants to sell at a reduced price at the end of the winter season.

Once the XML views of a suppliers' data are available, the reseller can access that data by formulating queries over the XML view. Some examples of such queries may include: 1) retrieve products whose sale price is less than 50% of the retail price; 2) count the number of "defective" reports for a product; and 3) compute minimum and maximum cost of outerwear stock. As these queries might suggest, the reseller is typically interested only in a small subset of the information provided by the suppliers. Those skilled in the art will recognize that these queries could be formulated as SQL queries over the supplier's relational database, but relational schemas can differ from supplier to supplier and may not be accessible by the reseller.

I. Architecture of SilkRoute

FIG. 1 shows an illustrative architecture of SilkRoute according to the present invention. SilkRoute 100 serves as middleware between a relational database server (RDBMS) 110 and an application 120 accessing data over a distributed network, such as the Web/Intranet 130. The distributed network may be a public or private network. According to the invention, the database administrator starts by writing a view query that defines the XML virtual view of the database. In a preferred implementation of the present invention, the view query is an RXL query. The view query is typically complex, because it transforms the relational data into a deeply nested XML view. The resulting view query is virtual, meaning that it is not evaluated, but kept in source code.

Typically, applications contact SilkRoute 100 to request data. An application 120 only "sees" the virtual XML view, not the underlying relational database. To access the data, the application 120 can formulate a user query in XML-QL over the virtual view and send it to SilkRoute 100. Together, the view query (e.g., RXL view query) and the user query (e.g., XML-QL user query) can be passed to the query composer module 102 in SilkRoute 100. The query composer module 102 computes the composition and produces a new view query (e.g., RXL query), called the executable query. The answer to the executable query typically includes only a small fragment of the database, e.g., one data item, a small set of data items, or an aggregate value. The result of SilkRoute 100 is an XML document, as specified by the user query (e.g., XML-QL user query).

Once computed, the executable query is passed to the translator 104, which partitions the executable query into a data-extraction part, e.g., one or more SQL queries, and an XML-construction part, e.g., an XML template. The translator 104 also may take as an input a description of the relational schema and uses the relational schema to perform syntax checking of the RXL query (e.g., to ensure that the relations named in the RXL query exist in the relational database) and to determine the capabilities of the SQL dialect used by the relational database (e.g., does the SQL dialect support inner joins?).

Until now, SilkRoute 100 has manipulated only query source code, but no data. At this point, the data extraction part (e.g., SQL queries) is sent to the RDBMS server 110, which returns one tuple stream per each query (e.g., SQL query) in the data extraction part. The XML generator module 106 merges the tuple streams with the XML-construction part and produces the XML document, which is then returned to the application 120.

This scenario is probably the most common use of SilkRoute. However those skilled in the art will recognize that minor changes to the information flow in FIG. 1 can permit other scenarios. For example, the data administrator may export the entire database as one large XML document by materializing the view query. This can be done by passing the view query directly to the translator. In another scenario, the result of query composition could be kept virtual for later composition with other user queries. This is useful, for example, when one wants to define a new XML view from an existing composed view.

A. The View Query: RXL

Next, RXL (Relational to XML transformation Language) is described. RXL essentially combines the extraction part of SQL, i.e., a from and a where clause (possibly followed by sort by and/or group by clauses) with the construction part of XML-QL, i.e., the construct clause.

As a first example, consider this RXL query, which defines a fragment of an XML view:

```
from Clothing $C
where $c.category = "outerwear"
construct    <product>
             <name>$c.item</name>
             <category>$c.category</category>
             <retail>$c.price</retail>
             </product>
```

Given a database like that in the supplier's schema, the query can produce an XML fragment like the following:

A root element is missing; later it will be explained how to add one.

As in SQL, the from clause declares variables that iterate over tables. Variable names start with a $. In this example, $c is a tuple variable that iterates over the Clothing table. The where clause contains zero or more filters (Boolean predicates) over column expressions. The column expression $c.item refers to the item attribute value of $c and in this case, requires that it equal the string "outerwear". The construct clause specifies the XML value, called an XML template, in terms of the bound column expressions.

RXL has three powerful features that make it possible to create arbitrarily complex XML structures: nested queries, Skolem functions, and block structure. An example of a nested query is:

```
construct <view>{
        from Clothing $c
        construct <product>
                <name>$c.item</name>
                { from Problems $p
                  where $p.pid = $c.cid
                  construct <report>$p.comments</report>
                }
                </product>
   } </view>
```

The outer query has no from or where clauses, only a <construct> clause for the root element <view>. The first sub-query builds one <product> element for each row in Clothing. Its inner sub-query creates zero or more <report> sub-elements, one for each report associated with that product. Those skilled in the art and familiar with SQL will recognize this as a left-outer join of Clothing with Problems followed by a group by on Clothing.

Skolem functions allow the way elements are grouped to be controlled. Recall that in XML an attribute with type ID contains a value that uniquely identifies the element in the document, i.e., a key. In RXL, the distinguished attribute ID always has type ID, and its value is a Skolem term, which is used to control grouping and element creation. For example, in the following:

```
from Clothing $c
construct <category ID=Cat($c.category) name=$c.category>
        <product>$c. item</product>
        </category>
```

Cat is a Skolem function and Cat ($c.category) is a Skolem term whose meaning is that only one <category> element exists for every value of $c.category, and it includes all products in that category:

<category> <product>p1</product> <product>p2<product> </category>
<category> <product>p3</product> <product>p4</product> </category>

Without the ID attribute and its Skolem term, the query would create one <category> element for each row in <product> <name>... </name> <category>... </category> <retail>... </retail> </product>
<product> <name>... </name> <category>... </category> <retail>... </retail> </product>

Clothing:

```
<category> <product>p1</product> </category>
<category> <product>p2</product> </category>
```

When Skolem terms are missing, RXL introduces them automatically. Since Skolem terms could be used to define arbitrary graphs, RXL enforces semantic constraints that guarantee a view always defines a tree, and therefore, a well-formed XML document. For example, the Skolem term of a sub-element includes all the variables of its the parent element.

Finally, the block structure allows RXL to construct parts of complex elements independently. The query below shows an illustrative multi-block RXL view query containing two blocks.

```
construct
    <view ID=View( )>
        { from Clothing $c
        construct    <product ID=Prod($c.item)>
                        <name ID=Name($c.item)>$c.item</name>
                        <price ID=Price($c.item, $c.price)>$c.price</price>
                     </product>}
        { from Clearance $d
        where $d.disc > 50
        construct    <product ID=Prod($d.prodname)>
                        <name ID=Name( $d.prodname)>$d.prodname</name>
                        <discount ID=Discount($d.prodname,$d.disc)>$d.disc</discount>
                     </product>
    </view>
```

The first block creates elements of the form:

<product><name>n</name><price>p</price></product> for each product name in Clothing. The second block creates elements of the form:

<product><name>n</name><discount>d</discount></product> for each product name in Clearance. It is to be assumed that Clearance(*prodname, disc) is part of the supplier's schema. When the same product name occurs both in Clothing and Clearance, then the two elements will have the same ID key and can be merged into:

<product><name>n</name><price>p</price><discount>d</discount></product>

Those skilled in the art and familiar with SQL will recognize this as a full outer join.

The below code contains the complete view query, RXL view query (V), for the supplier relational schema example described above.

```
1.    construct
2.    <supplier 1D=Supp( )>
3.        <company ID=Comp ( )>"Acme Clothing"</company>
4.        {
5.        fromClothing$c
6.        where $c.category = "outerwear"
7.        construct
8.            <product ID=Prod($c.pid)>
9.            <name ID=Name($c.pid,$c.item)>$c.item</name>
10.           <category ID=Cat($c.pid,$c.category)>$c.category</category>
11.           <descriptionID=Desc($c.pid,$c.description)>$c.description</description>
12.            <retail ID=Retail($c.pid,$c.price)>$c.price</retail>
13.          { from SalePrice $s
14.            where $s.pid = $c.pid
15.            construct
16.            <sale ID#Sale($c.pid,$s.pid,$s.price)>$s.price</retail>
17.          }
18.          { from Problems $p
19.            where $p.pid = $c.pid
20.            construct
21.            <report code=$p.code ID=Prob($c.pid,$p.pid,$p.code,$p.comments)>
22.                $p.comments
```

-continued

```
23.            </report>
24.         }
25.       </product>
26.    }
27. </supplier>
```

Lines 1, 2, and 27 create the root <supplier> element. Notice that the Skolem term Supp( ) has no variables, meaning that one <supplier> element is created. The outermost clause constructs the top-level element supplier and its company child element. The first nested clause (lines 4–26) contains the query fragment described above, which constructs one product element for each "outerwear" item. Within this clause, the nested clause (lines 13–17) expresses a join between the Clothing and Sale Price tables and constructs a sale element with the product's sale price nested within the outer product element. The last nested clause (lines 18–24) expresses a join between the Clothing and Problem tables and constructs one report element containing the problem code and customer's comments; the report elements are also nested within the outer product element. Notice that the Skolem term of product guarantees that all product elements with the same identifier are grouped together. Usually Skolem terms can be inferred automatically, but they have been included explicitly, because they are relevant to query composition described herein.

B. The User Query: XML-QL

Applications do not access the relational data directly, but through the XML view. To do so, applications provide user queries in XML-QL, a query language specifically designed for XML. XML-QL queries contain a where clause followed by a construct clause. The where clause contains an arbitrary number of XML patterns and filters. The construct clause is identical to that in RXL.

In the example described herein, the reseller can retrieve all products with a sale price less than half of the retail price using the XML-QL user query (U) below:

```
1.   construct
2.   {
3.      where <supplier>
4.         <company>$company</company>
5.         <product>
6.            <name>$name</name>
7.            <retail>$retail</retail>
8.            <sale>$sale</sale>
9.         </product>
10.     </supplier>in "http://acme.com:/products.xml",
11.     $sale <0.5 * $retail
   12.  construct
      13.    <result ID=Result($company)>
         14.    <supplier>$company</supplier>
         15.    <name>$name</name>
      16.    </result>
17. 
```

The where clause includes a pattern (lines 3–10) and a filter (line 11). A pattern's syntax is similar to that of XML data, but also may contain variables, whose names start with $. Filters are similar to RXL (and SQL). The meaning of a query is as follows. First, all variables in the where clause are bound in all possible ways to the contents of elements in the XML document. For each such binding, the construct clause constructs an XML value. Grouping is expressed by Skolem terms in the construct clause. In this example, the construct clause produces one result element for each value of $company. Each result element contains the supplier's name and a list of name elements containing the product names.

In this example, the answer to the user query includes a small fraction of the relational database, i.e., only those products that are heavily discounted.

C. The Query Composer

The query composer module 102 of SilkRoute 100 takes a user query and the RXL view query and generates a new RXL query, which is equivalent to the user query evaluated on the materialized view. In the example described herein, the view query is the RXL view query (V) above, the user query is the XML-QL user query (U), and the composed query, RXL query (C) is shown below.

```
construct

{ from Clothing $c, SalePrice $s
    where $c.category = "outerwear",
       $c.pid = $s.pid,
       $s.price < 0.5 * $c.retail
  construct
       <result ID=Result("Acme Clothing")>
          <supplier>"Acme Clothing"</supplier>
          <name ID=Name($c.pid, $c.item)>$c.item</name>
       </result>
  }

```

The composed query combines fragments of the view query and user query. Those fragments from the user query are highlighted. The composed query extracts data from the relational database in the same way as the view query. It also includes the user filter $s.price<0.5 $c.retail and structures the result as in the user query. The details of the composition are subtle, and a complete description of the composition algorithm is described later herein.

The composed query is referred to as executable, because it is typically translated into SQL queries and sent to the relational database engine. The answer of the executable query is quite small—the same as that of the user query. In general, it is more efficient to execute the composed query, instead of materializing the view query, because composed queries often contain constraints on scalar values that can be evaluated using indexes in the relational database. Such indices are of little or no use when evaluating a view query. For example, consider a user query that specifies the condition: $s.price between 80 and 100. This condition is propagated into the executable query, and then into the SQL query, and can be evaluated efficiently if an index exists on price. In contrast, an index on price is useless when materializing the view query directly.

D. Translator and XML Generator

The translator 104 takes an RXL query and decomposes it into one or more SQL queries and an XML template. The RDBMS 110 server or engine executes the SQL queries, and their flat results (streams of tuples) are converted into XML by the XML generator 106.

The translator 104 also takes a source description, which is an XML document specifying systems information needed to contact the source: the protocol (e.g. JDBC), the connection string, and a source-specific query driver. The driver translates RXL expressions into the source's query language, which is typically a dialect of SQL. Although one skilled in the art will appreciate that other query languages can be supported. For example, the executable RXL query (C) is translated into the following SQL query:

```
select       c.pid as pid, c.item as item
from         Clothing c, SalePrice s
where        c.category = "outerwear",
             c.pid = s.pid,
             s.price < 0.5 * c.retail
sort by c.pid
``` and into the XML template:

```

<result ID=Result("Acme Clothing")>
        <supplier>"Acme Clothing"</supplier>
        <name ID=Name($pid, $item)>$item</name>
    </result>

``` where the variables $pid and $item refer to the attributes pid and item in the SQL query's select clause; the template generation is described in more detail in section II, part A below. After translation, the SQL query is sent to the relational engine, RDBMS 110 and the resulting tuple stream is fed into the XML generator 106, which produces the XML output.

In this example, the translation requires only one SQL query. In general, there may be several ways to translate a complex RXL query into one or more SQL queries and to merge tuple streams into the XML result. Choosing an efficient evaluation strategy may be important when the RXL query returns a large result, e.g., if the entire XML view if materialized. SilkRoute can have one or more evaluation strategies, which can generate one SQL query for each disjunct of an RXL sub-query, which should be in disjunctive-normal form (DNF). Each SQL query has a sort-by clause, making it possible for the XML generator 106 to merge the queries into an XML document in a single pass.

E. Alternative Approaches

The above example of the present invention has been described in terms of a general approach for exporting relational data into XML. Other approaches are possible, and in some cases, may be more desirable.

Currently, the most widely used Web interfaces to relational databases are HTML forms with CGI scripts. A script can translate user inputs into SQL queries, and the query answers can be rendered in HTML. The answers could be generated just as easily in XML. Forms interfaces may be appropriate for casual users, but may not be appropriate for data exchange between applications, because they limit the application to only those queries that are predetermined by the form interface. Aggregate queries, for example, are rarely offered by form interfaces.

In another alternative implementation of the invention, the data provider can either pre-compute the materialized view or compute the view on demand whenever requested by an application. This alternative can be feasible when the XML view is small and the application needs to load the entire XML view in memory, e.g., using the DOM (document object module defined by the World Wide Web Consortium DOM Recommendation) interface. However, pre-computed views are not dynamic (i.e., their data can become stale) and are not acceptable when data freshness is critical.

Another alternative implementation of the present invention uses a native XML database engine, which can store XML data and process queries in some XML query language. XML engines will not replace relational databases, but a high-performance XML engine might be appropriate to use in data exchange. For example, one could materialize an XML view using SilkRoute and store the result in an XML engine that supports an XML query language, thus avoiding the query composition cost done in SilkRoute. However, XML engines may not match the performance of commercial SQL engines anytime soon. In addition, this approach can suffer from data staleness, and incur a high space cost (e.g., for disk space) because it duplicates the entire data in XML.

II. Query Composition

In this section, the query composition algorithm is described. As discussed previously, an RXL query, such as V, takes a relational database as an input and returns an XML document as an output. The XML-QL user query, such as U, which is written against V, takes an XML document as an input and returns an XML document. For any database D, the result of U can be computed by first materializing V(D), denoted as XMLD, and then computing U(XMLD). The query composition problem is to construct an equivalent RXL query C, where C=U ? V. In other words, it would be desirable to construct an RXL query C that is guaranteed to yield the same result as U and V for any database D, that is, C(D)=U(V(D)). C takes as an input a relational database and returns an XML document. With C, the construction of the intermediate result XMLD is skipped. As an example, RXL view query (V), and XML-QL user query (U) can be used with the result of the composition, C, being composed RXL query (C).

Before describing the details, a brief intuitive description is given. The key observation is that all XML components (tags, attributes, #PCDATA) present in XMLD are explicitly mentioned in the construct clause(s) of RXL view query (V). When XML-QL user query (U) is evaluated on XMLD, its patterns are matched with these components. The key idea is to evaluate XML-QL user query (U) on the templates of RXL view query (V) directly, without constructing XMLD. During this evaluation only the patterns are considered and not the filters occurring in user query (U). In this example, user query (U) has a unique pattern that mentions <supplier>, <company>, <product>, <name>, <retail>, and <sale> with a particular nesting, and all these tags also occur in the templates of view query (V) under the same nesting. RXL view query (V) is shown again below, this time after the matching, with the matched tags in bold font.

```
construct
<supplier ID=Supp( )>
<company ID=Comp( )>"Acme Clothing"</company>
{
    from Clothing $c
    where $c.category = "outerwear"
    construct
      <product ID=Prod($c.pid)>
      <name ID=Name($c.pid,$c.item)>$c.item</name>
      <category ID=Cat($c.pid,$c.category)>$c.category</category>
      <retail ID=Retail($c.pid,$c.price)>$c.price</retail>
      { from SalePrice $s
        where $s.pid = $c.pid
        construct
          <sale ID=Sale($c.pid,$s.pid,$s.price)>$s.price</sale>
      }
      { from Problems $p
        where $p.pid = $c.pid
```

```
        construct
          <report code=$p.code
           ID=Prob($c.pid,$p.pid,$p.code,$p.comments)>
              $p.comments
          </report>
        }
      </product>
    }
  </supplier>
```

That is, the RXL view query (V) is shown with patterns from the XML-QL user query (U) highlighted. Once the matching is done, the composed query (C) can be constructed in a second step, as follows. The construct clause of the composed query (C) is the same as the construct clause of the XML-QL user query (U), modulo variable renaming. The from and where clauses of the composed query (C) include both of the "relevant" from and where clauses in the view query (V) and of all the where filter conditions in the user query (U), modulo variable renaming. This completes the construction of composed query (C). In this example, the "relevant" from and where clauses are:

```
    from Clothing $c, SalePrice $s
      where $c.category = "outerwear", $s.pid = $c.pid
``` and the where filter condition in user query (U) is $sale<0.5 $retail which becomes the following after variable renaming:

```
    where $s.price < 0.5 * $c.retail
```

Inspection of the composed RXL query (C) shown above indicated that the from and where clauses, together, form the from and where clauses of the composed query (C).

Figure 2:
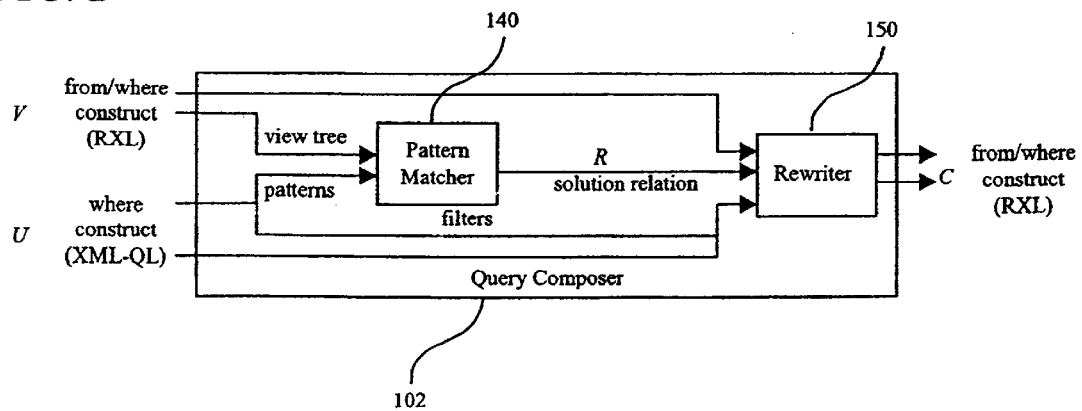
FIG. 2 depicts an illustrative architecture of query composition according to the present invention.

FIG. 2 depicts the architecture of query composition according to the present invention. The pattern matcher 140 implements a first step, which involves evaluating user queries (U) on view query (V) templates. During the first step, the user query (U) patterns are matched with view query (V) templates. The result is a solutions relation, R, in which each tuple represents one match. Multiple matches may occur if the patterns contain alternation, e.g., <company|organization>, or Kleene-star operators, e.g., <*.supplier>, or tag variables <$elm>. A rewriter 150 carries out a second step by taking the remaining clauses (the from and where of the view query (V) and the construct of the user query (U)) and the relation R, and rewriting each solution tuple into one RXL clause. The result is the composed query C.

The illustrative query composition technique can be viewed as an example of partial evaluation, where the patterns are evaluated at composition time (a.k.a. compile time) on view query (V) templates, and the filters and constructors are evaluated at run time when the new RXL view is evaluated. Section II, parts A–D of the description describe the internal representation of view and user queries and provide a detailed description of an illustrative composition algorithm according to the present invention. A pseudo code version of the algorithm appears in section III.

A. Step 1: Pattern Matching

In Step 1, the solutions relation R that contains all matchings of user query (U) patterns with view query (V) templates can be constructed.

1. Construct the View Tree.

For the composition algorithm, the view query V may be represented by a data structure called a view tree, which includes a global template and a set of datalog rules. The global template can be obtained by merging all view query (V) templates from all its construct clauses. Nodes from two different templates may be merged if and only if they have the same Skolem function. Hence, each Skolem function occurs exactly once in the view tree. The datalog rules are non-recursive. Their heads are the Skolem functions names, and their bodies include relation names and filters. The datalog rules can be constructed as follows. For each occurrence of a Skolem function F in a view query (V), one rule is constructed of the form F(x, y, . . . ):-body, where body is the conjunction of all from and where clauses in the scope where F occurs. When a rule is associated with a Skolem function, then that rule guards the Skolem function and its corresponding XML element. In both the template and datalog rules, the tuple variables used in RXL can be replaced by column variables.

Below is the template of the view tree for the RXL query on the left and the datalog rules of the view tree for the RXL query on the right according to the illustrative example of the present invention described herein.

```
<supplier ID=Supp( )>                               Supp( )    :- true
  <company ID=Comp( )>Acme Clothing                 Comp( )    :- true
  </company>
  <product ID=Prod($cpid)>                          Prod($cpid) :-Clothing($cpid, _,$category, _,_) ,$category= "outerwear"
    <name ID=Name($cpid,$citem)>                    Name($cpid, $citem) :- Clothing($cpid, $citem, $category, _,_),
                                                                           $category = "outerwear"
        $citem
    </name>
    <category ID=Cat($cpid,$ccategory)>             Cat($cpid, $ccategory) :- Clothing($cpid, _, $category, _,_),
                                                                              $category = "outerwear"
        $ccategory
    </category>
    <retail ID=Retail($cpid,$cprice)>               Retail($cpid, $cprice) :- Clothing($cpid, _, $category, _, $cprice),
                                                                              $category = "outerwear"
        $cprice
    </retail>
    <sale ID=Sale($cpid,$spid,$sprice)>             Sale($cpid, $spid, $sprice) :-
        $sprice                                     Clothing($cpid, _, $category, _,_), $category = "outerwear",
    </sale>                                         SalePrice($spid, $sprice), $cpid = $spid
    <report ID=Rep($cpid,$ppid,$pcode,$pcmnts)      Rep($cpid, $ppid, $pcode, $pcmnts) :-Clothing($cpid, _, $category, _,_),
                           code=$Pcode>                                                  $category = "outerwear",
```

| | |
|---|---|
| $pcmnts | Problems($ppid, $pcode, $pcmnts), $cpid = $ppid |
| </report> | |
| </product> | |
| </supplier> | |

The unique supplier element is guarded by the rule Supp( ):-true, which is always true, because no predicate expression guards the element's creation. The retail elements are guarded by the rule:

Retail($cpid, $cprice):-Clothing ($cpid, _, $category, _, $cprice), $category="outerwear" which means that one retail element is created for each value of cpid and cprice that satisfies the table expression on the right-hand side. There is only one datalog rule for each Skolem function, because each function occurs once in the query view (V).

2. Evaluate User View (U) on the View Tree.

Next, the patterns of user view (U) can be matched with the template of view query (V). To simplify presentation, it is assumed that the user view (U) includes a single block as represented by Equation 1:

$$U=\text{construct}<\text{elm}>\{\text{where } P, W \text{ construct } T\}</\text{elm}> \quad (1)$$

where T denotes the template, P denotes all patterns, and W denotes all filters. New, temporary variables in U's patterns can be introduced, with one variable for the ID attribute of each element in the pattern. In this example, U has a single pattern and six new variables are added, one temporary variable for each element in the pattern, as shown below.

```
<supplier ID=$t1>
    <company ID=$t2>$company</company>
    <product ID=$t3>
        <name ID=$t4>$name</name>
        <retail ID=$t5>$retail</retail>
        <sale ID=$t6>$sale</sale>
    </product>
</supplier>
```

The necessity of these variables and how to handle multi-block user queries are described in section II, part A(3) below.

Next, U's patterns on V's template are evaluated in the standard way of evaluating patterns on a tree. In general, there may be zero, one, or more results. The results can be represented as a table R, with one column for each variable in U, and one row for each result. The values in the table are #PCDATA, Skolem terms, variables, tag names, attribute values, and attribute names, which occur in V's template. In this example, the step results in the following table R:

template. The row specifies that U's variable $name is bound to $citem in V, the variable $t3 is bound to the Skolem term Prod($cpid), and the variable $company is bound to the #PCDATA "Acme Clothing".

B. Step 2: Query Rewriting

In Step 2, the table R can used to construct the composed query C. Each row in R represents one match, and composed query C is the union of all possible matches. In particular, composed query C includes several parallel blocks, which denote a union in RXL. In each block, the from and where clauses contain the "relevant" datalog rules, that is the rules for the Skolem functions in the corresponding row. The construct clause of the block contains the template of the user view U. Recall that U includes a single block (Eq. 1), and that T denotes its template, P its patterns, and W its filters. Let the rows in R be $r_1 \ldots r_k$. Then C includes several parallel blocks:

$$C = \text{construct } \{ <\text{elm}>\{B_1\} \ldots \{B_k\} </\text{elm}> \}$$

with one or more blocks corresponding to each row $r_i$. In the next section, how blocks corresponding to one row, $r_i$, in R are constructed is described.

1. Contruct One Block

To construct the from and where clauses of one block, the clauses are represented as one datalog rule. Then, the rule is converted into a from-where clause. Let $F_1 \ldots F_n$ be the Skolem functions that occur in the row $r_i$. Recall that the view tree associates one or more datalog rules to each Skolem function. Assume that there is a unique datalog rule for each Skolem function:

$$F_1\text{:-body}_1 \ldots F_n\text{-body}_n.$$

The block's construct clause is $S_0(T)$ where $S_0$ is a variable substitution defined below. For each datalog rule $F_i$, one variable substitution $S_i$ is applied. The body of the new datalog rule is the union of all bodies after variable substitution, plus $S_0(W)$. Thus, the new rule has the form:

$$Q(S_0(x), S_0(y), \ldots )\text{:-}S_0(W), S_1(\text{body}_1), \ldots S_n(\text{body}_n)$$

where x, y, ... are the variables in U's template T. Next, Q is minimized, and rewritten as a from-where clause: all relation names appearing in the from clause, and all filters appearing in the where clause. This completes the construction of one block.

| $t1 | $t2 | $company | $t3 | $t4 | $name | $t5 | $retail | $t6 | $sale |
|---|---|---|---|---|---|---|---|---|---|
| Supp( ) | Comp( ) | Acme Clothing | Prod($cpid) | Name($cpid, $cprice) | $citem | Retail($cpid, $cprice) | $cprice | Sale($cpid, $spid, $sprice) | $sprice |

The column names correspond to the variables in U's single pattern shown above. The single row in R means that there exists only one matching of U's pattern with V's 2. Variable Substitutions Next, the substitutions of $S_0$ and $S_1 \ldots S_n$ are defined. For all the datalog rules $F_1 \ldots F_n$, the substitutions $S_1 \ldots S_n$ are constructed so that the expressions $S_1(body_1) \ldots S_n(body_n)$ all have distinct variables, with one exception. For every two columns $t_j$, $t_k$ in R, where the variable $t_j$ corresponds to an element that is the parent of $t_k$'s element, all variables in $S_j(F_j(\ldots))$ can be shared with $S_k(F_k(\ldots))$. To compute $S_0$, the substitutions $S_1 \ldots S_n$ are applied to the entire row $r_i$ and drop all columns in $r_i$ that correspond to the temporary variables $\$t1 \ldots \$t2$. The new row is $S_0$, which maps U's variables to variables, constants, and Skolem terms.

When there is more than one datalog rule per Skolem function, the resulting datalog program is converted into disjunctive normal form, i.e., a disjunction of multiple conjunctive datalog rules, before generating the RXL blocks. For each conjunctive rule, the construction above can be applied to obtain one block and take the union of all such blocks. In this case, more than one block for one row $r_i$ can be obtained.

In this example, table R has one row that contains the Skolem terms Supp( ), Comp( ), Prod($cpid), Name($cpid, $citem), Retail($cpid, $cprice), and Sale($cpid, $spid, $sprice). Their corresponding datalog rules are shown in the view tree for the RXL query in section II, part A(1) above. Next, the substitutions $S_1, \ldots, S_6$ are computed such that the rules have disjoint variables with the exception of variables that have parent/child relationships. In this example, the variable $t3 is the parent of variables $t4, $t5, $t6; see the pattern in section II, part A(2) above. Therefore the Skolem term Prod($cpid) shares the variable $cpid with that in Name ($cpid, $citem), Retail ($cpid,$cprice), and Sale ($cpid, $spid, $sprice). Otherwise, all variables must be distinct. The modified rules are:

```
Supp( )                        :-   true
Comp( )                        :-   true
Prod($cpid)                    :-   Clothing($cpid, _, $category1, _,_), $category1 = "outerwear"
Name($cpid, $citem)            :-   Clothing($cpid, $citem, $category2, _,_), $category2 = "outerwear"
Retail($cpid, $cprice)         :-   Clothing($cpid, _, $category3, _, $cprice), $category3 = "outerwear"
Sale($cpid, $spid, $sprice)    :-   Clothing($cpid, _, $category4, _,_) $category4 = "outerwear",
                                    SalePrice($spid, $sprice), $cpid = $spid
```

The substitution $S_0$ is obtained directly from the table R, by dropping all columns corresponding to the new variables $\$t1, \ldots, \$t6$:

| $S_0 =$ | | | | |
|---|---|---|---|---|
| | $company | $name | $retail | $sale |
| | Acme Clothing | $citem | $cprice | $price |

The template T of U is in the user query shown in section I, part B. The filter W of U is $sale<0.5*$retail. Only the variables $company and $name occur in T, so $S_0$($company) and $S_0$($name) need to be included in the rule's head; $company, however, is a constant, therefore the rule becomes:

```
Q($citem) :- Clothing($cpid, -, $category1, _,_), $category1 = "outerwear",
             Clothing($cpid, $citem, $category2, _,_), $category2 = "outerwear",
             Clothing($cpid, _, $category3, _, $cprice), $category3 = "outerwear",
             Clothing($cpid, _, $category4, _,_), $category4 = "outerwear", SalePrice($spid,
             $sprice), $cpid = $spid,
             $sprice < 0.5 * cprice
```

The last line is $S_0(W)$. Minimizing Q, the following equivalent query is obtained:

```
Q($citem) :- Clothing($cpid, _, $category3, _, $cprice),$category3 = "outerwear",
             SalePrice($spid, $sprice), $cpid = $spid, $sprice < 0.5 * cprice
```

Finally, the rule can be converted into from and where clauses, and a construct clause can be added whose template is $S_0(T)$:

```
from        Clothing($cpid, _, $category3, _, $cprice),
            SalePrice($spid, $sprice)
where       $category3 = "outerwear", $cpid = $spid, $sprice < 0.5 * cprice
construct   <result ID= Result("Acme Clothing")>
                <supplier>Acme Clothing </supplier>
                <name> $citem </name>
            </result>
```

Lastly, column variables are replaced by tuple variables, and the single-block query C shown in section I, part C can be obtained.

C. Other Exemplary Implementations

The above-described exemplary implementation of the present invention illustrates a simple example of query composition. Below, several other exemplary implementations of the present invention that illustrate more complex cases are described.

1. View Tree for Multi-block Query

Consider the two block RXL query in section I, part A. Below, on the left side is the view tree template for the two block query and on the right side is the datalog for the two block query.

```
<view ID=View( )>                                   View( )              :- true
    <product ID=Prod($name)>                        Prod($name)          :- Clothing($name, _)
                                                    Prod($name)          :- Clearance($name, $ddisc), $ddisc > 50
        <name ID=Name($name)>                       Name($name)          :- Clothing($name, _)
            $name                                   Name($name)          :- Clearance($name, $ddisc), $ddisc > 50
        </name>
        <price ID=Price($name, $cprice)>            Price($name,$cprice)     :- Clothing($name, $cprice)
            $cprice
        </price>
        <discount ID=Discount($name, $ddisc)>       Discount($name, $ddisc)  :- Clearance($name, $ddisc),
                                                                                  $ddisc > 50
            $ddisc
        </discount>
    </product>
</view>
```

In the RXL query, the Skolem functions Prod and Name occur twice. In the view tree, each function has two corresponding datalog rules, but in the template, they occur once.

2. Multiple Rows

In general, R may contain multiple rows. To illustrate R with multiple rows, the query V described and shown in section II, part A(1) is employed. R is composed with the following XML-QL user query U':

```
construct  {
    where <supplier.product.(retail | sale)>$val</> in "http://acme.com/products.xml"
    construct <price>$val</price>
}   
```

The regular expression supplier.product.(retail|sale) matches a retail or a sale element nested within a supplier and a product element. It is analogous to the XPath expression /supplier/product/retail|sale. There are two matches of U with V, which produce two rows in R:

| $t1 | $t2 | $t3 | $val |
|---|---|---|---|
| Supp( ) | Prod($cpid) | Retail($cpid, $cprice) | $cprice |
| Supp( ) | Prod($cpid) | Sale($cpid, $spid, $sprice) | $sprice |

The temporary variables $t1, $t2, $t3 are for supplier, product, and retail | price, respectively. The composed query C has two blocks:

C=construct{B1}{B2}

The relevant datalog rules for the first row are those for Supp, Prod and Retail of view query described in section II, part A(1). No variables are renamed, because $t2 is the parent of $t3. The generated datalog rule after minimization is:

$Q(\$cprice):-Clothing(\$cpid, \_, \$category, \_, \$cprice), \$category="outerwear"$ and it produces C's first block B1:

| B1 = | from Clothing $c<br>where $c.category="outerwear"<br>construct <price>$c.price</price> |
|---|---|

The relevant datalog rules for the second row are those for Supp, Prod, and Sale. As before, no variables are renamed, and the datalog rule is:

$Q(\$cprice):-Clothing(\$cpid, \_, \$category, \_, \_), \$category="outerwear", SalePrice(\$spid, \$sprice), \$cpid=\$spid$ which produces C's second block B2:

| B2 = | from Clothing $c, SalePrice $s<br>where $c.category="outerwear", $c.pid = $s.pid<br>construct <price> $c.pid </price> |
|---|---|

3. Adding Template Variables

The temporary variables $t1, $t2, etc. added to U's patterns play an important role, as revealed by the next example. The query V, written directly with column variables, is:

V = construct <v ID=H( )> { from T($x, $y)
        construct <a ID = F($x)>
            <b ID = G($x, $y)> $y </b>
        </a>
} </V> and the two XML-QL queries U, U' can be considered:

U = construct  { where <v><a><b>$z1</b> <b>$z2</b></a></v>
    construct <result><z1>$z1</z1> <z2>$z2</z2></result>
} 
U'= construct { where <v><a><b>$z1</b></a> <a><b>$z2</b></a> </v>
    construct <result><z1>$z1</z1> <z2>$z2</z2></result>
}

Both return pairs of <b> values, but the first query returns pairs where both <b>'s are in the same <a> element. Without temporary variables in U's patterns, the relation R would be the same for U and U'. After introducing the new variables, the two relations R have different column names, and as expected, they produce two distinct composed queries.

4. Renaming Variables in Datalog Rules

Continuing with the previous example, the need for the substitutions $S_1, S_2, \ldots$. First, V's view tree is constructed:

| <v | ID=H( )> | | H( ) | :- | true |
|---|---|---|---|---|---|
| | <a ID = F($x)> | | F($x) | :- | T($x, \_) |
| | <b ID = G($x, $y)>$y</b> | | G($x, $y) | :- | T($x, $y) |
| </v> | | | | | |

Next, the composition with U' is illustrated. Five temporary variables are added and U's pattern becomes:

| <v ID=$t1> | <a ID=$t2><b ID=$t3>$z1</b></a> |
|---|---|
| | <a ID=$t4><b ID=$t5>$z2</b></a> |
| </v> | |

Matching the pattern with the template produces one row in R:

| $t1 | $t2 | $t3 | $z1 | $t4 | $t5 | $z2 |
|---|---|---|---|---|---|---|
| H( ) | F($x) | G($x, $y) | $y | F($x) | G($x, $y) | $y |

Intuitively the variable $y in the $z1 column is different from $y in the $z2 column, because they match different <b> elements, possibly in different <a> elements. This distinc tion is made precise by the renaming step. Thus, after variable renamings, the five relevant datalog rules become:

| H( ) | :- true |
| F($x1) | :- T($x1, _) |
| G($x1, $y1) | :- T($x1, $y1) |
| F($x2) | :- T($x2, _) |
| G($x2, $y2) | :- T($x2, $y2) | and the composed query C, after query minimization, is:

```
construct  from T($x1, $y1), T($x2, $y2)
        consruct <result><z1>$y1</z1> <z2>$y2</z2></result>

```

5. XML-QL Queries with Block Structure.

In general, U may have several blocks, both nested and parallel. For multi-block user queries, a different table R for each block in U can be constructed, in the same way in which the XML-QL query processor handles multiple blocks. Tables corresponding to parallel blocks are independent; for nested blocks, there is a distinct inner table that corresponds to each row in the outer table. The composed query C follows the same block structure, except that one block in U may generate multiple parallel blocks in C, as described above early in this section.

6. Query Minimization

Query minimization eliminates redundancies in queries, such as duplicate conditions. Query minimization can be expensive, because it is NP-complete. That is, the complexity of query minimization is exponential in the number of variable in the query. Commercial database systems often do not perform minimization, because users typically do not write redundant queries. In SilkRoute, the composed query C can be generated automatically. One condition in a view query V may appear in multiple datalog rules, and, hence be propagated as multiple copies in the generated query C. To avoid query minimization, one could trace these repetitions to the original RXL query, but care is needed to deal with variable renamings. For RXL queries with large parallel blocks, however, query minimization may be unavoidable.

D. Aggregation Queries

Briefly, it is described how aggregations in XML-QL queries can be "pushed" into composed RXL views and evaluated by the target RDBMS according to the present invention. In both XML-QL and RXL, Skolem terms can be used to specify the values by which aggregate expressions are grouped.

Suppose a reseller wants to count the total number of reports for each defective product. This can be expressed in XML-QL as follows:

```
where <supplier.product ID=$pid>
        <name>$n</>
        <report>$r</>
    </supplier> in "http://acme.com/products.xml"
construct <product ID=F($pid)>
        <name ID=G($pid,$n)>$n</>
        <totaldefects ID=H($pid)>count(*)</>
    </product>
```

The Skolem term F($pid) in <product ID=F($pid)> asserts that all bindings for the variables $pid, $n and $r are grouped by $pid's value. Similarly, the Skolem term H($pid) specifies the grouping attributes for the aggregate function count (*), which counts the total number of bindings. This idea is similar to the GROUP BY construct in SQL. XML-QL and RXL's semantics guarantee that only one element is produced for each value of a Skolem term, e.g., one name element is emitted for each value of $n.

A simple extension to datalog that accommodates aggregate functions can be used. An example of a datalog rule that can use a "generator" to count values is:

C(p, q, COUNT(*)):-R(p, q)

Only the last argument in the head can be an aggregate function; the other arguments specify the grouping attributes. The meaning is that C contains the set of triples (p, q, r) where r is the number of tuples in the group corresponding to values (p, q) in the relation R.

Using this composition algorithm, the XML-QL query above can be rewritten as:

```
from Clothing $c, Problems $p
where $c.pid = $p.pid
construct <product ID=F($c.pid)>
        <name ID=G($c.pid, $c.item)>$c.item</>
        <totaldefects ID=H($c.pid)>count(*)</>
    </product>
```

Note that the aggregate function can be "pushed" into the RXL view. When this view is materialized, the aggregation can be evaluated by the relational engine. Significantly, this query can be evaluated efficiently, because commercial database systems are often highly optimized for aggregation queries.

III. A Composition Algorithm—Pseudocode

In the formal description of the algorithm above, a notation for describing the types of values that are manipulated, e.g., view trees, XML-QL blocks, are needed. Types are denoted by grammar rules, such as the following:

| Node | :- | Tag, Rule, [ Node ] |
| Rule | :- | SkolemTerm, [ Condition ] |
| Condition | :- | TableExpr(String, [ Var ]) |
| | | Filter(BoolExpr) |
| | | Or([ Condition ], [ Condition ]) |

These rules specify that a view tree Node is composed of a tag, a rule, and a list of children nodes. A Rule is composed of a Skolem term (its head) and a conjunctive list of conditions (its body). A Condition is either a table expression, a filter expression, or the disjunction of two lists of conjuncts.

An XML-QL block is represented by a list of patterns, a list of filters, and a template. An RXL block is represented by a list of conditions and a template:

| XMLQL | :- | [ Pattern ], [ Filter ], Template |
| RXL | :- | [ Condition ], Template |

A template is either: a constant string; a variable; an element, which includes a tag and list of nested templates; or a nested query. To simplify presentation, templates are polymorphic, i.e., an XML-QL template contains only a nested XML-QL block and similarly, for an RXL template.

| Template | :- | Const(String) |
| | | Var(String) |
| | | Element(Tag, [ Template ]) |
| | | NestedQuery(XMLQL) |
| | | NestedQuery(RXL) |

Finally, a canonical pattern is represented by the head variable (that occurs on the right-hand side of it), a regular-path expression over strings, and the target variable (that occurs in the body of an element):

| Pattern | :- | Var, RegPathExpr, Var |

In this example, each regular-path expression is one string atom, but in general, strings can be combined with the alternation (|), concatenation (.), and Kleene-star (*) operators, similar to those used in regular expressions.

The composition function compose, as shown below, takes two environments, which are lists of (variable, value) pairs. Shown below is an illustrative top-level compose function for a composition algorithm:

Function compose (line 7) decomposes X_block into its patterns, filters, and template, and rewrites each nested pattern in a canonical form as a list of unnested patterns. New temporary variables are introduced to represent the intermediate nodes in the nested pattern.

On line 13, the patterns are evaluated in the current environment, producing R, which maps XML-QL variables to nodes and constants in the view tree. Each tuple in R represents one possible rewriting of the XML-QL query over the view. For each tuple r_i, the current environment is extended with the new variable bindings (line 19).

Function newVariables (line 22) computes the new mappings of XML-QL and RXL variables to common RXL variables. In summary, newVariables recovers the correspondence between Skolem terms that share a common ancestor in the XML-QL pattern; this correspondence determines the mappings for RXL variables. For XML-QL variables, the mapping is simple. If the corresponding value is a leaf node or constant value, the variable is replaced by its value in the substitution mapping S described in section II, part B. If the corresponding value is an internal node, the variable is replaced by the complete RXL expression that computes that element under the substitution S. Lastly, function oneSolution (line 25) takes the new environment and computes the new RXL blocks, which are appended to the list of other potential solutions.

The composition algorithm for the oneSolution function in the following code constructs the RXL block in three steps.

```
1.  // Top-level invocation of compose function
2.  X_env = new [("$viewtree", Root( )]
3.  S = new[ ]
4.  R_block_list = compose(X_env, S, X_block)
5.
6.  fun compose(Env X_env, VarMap S, XMLQL X_block)     : [ RXL ] {
7.      (X_patterns, X_Filters, X_template) = decompose(X_block);
8.
9.      // Get pairs of(parent, child) variables from XML-QL patterns
10.     X_parent_child_vars = getHeadTargetMap(X_patterns);
11.
12.     // Evaluate pattern on view tree
13.     R = evalPattern(X_patterns, X_env);
14.
15.     // Consider each potential solution
16.     R_blocks = new [ ]
17.     for each r_i in R {
18.         // Extend current environment with new variable bindings
19.         X_env' = appendList(X_env, r_i);
20.
21.         // Compute new S variable substitution from X_nodemap
22.         S' = newVariables(X_envl', X_parent_child_vars, S);
23.
24.         //Compute RXL block for potential solution
25.         R_blocks = listAppend(oneSolution(X_env', S', X_block, r_i), R_blocks)
26.     }
27.  return R_blocks
28. }
```

The initial environment (X_env) maps the distinguished variable $viewtree to the root of the view tree referenced by the query. The initial variable-substitution S that maps XML-QL variables to RXL expressions is empty, and X_block is the top-level XML-QL block (lines 1–3). In this example, $viewtree is bound to the root of the tree defined in the RXL query in section II, part A(1). The result of compose is a list of RXL blocks. In the pseudo-code, XML-QL expressions are prefixed by X_ and RXL expressions by R_.

```
1.   // Return new RXL block for potential solution in r_i
2.   fun oneSolution(Env X_env, VarMap S, XMLQL X_block, Env r_i) : [ RXL ] {
3.       R_conditions = new [ ]
4.       // For each XML-QL variable X_v in X_block
5.       foreach X_v in getVariables(X_block) {
6.           // Get view-tree node bound to X_v
7.           R_node = project(r_i, X_v);
8.           // Get rule associated with view-tree node
9.           (R_tag, R_rule, R_children) = R_node
10.          // Get body of rule
11.          (R_head, R_body) = R_node;
12.          foreach R_condition in R_body {
13.              R_condition' = makeCopy(R_condition)
14.              // Rename head variables in R_condition' and add to R_conditions
15.              R_conditions = cons(rewriteR(S, R_condition'), R_conditions)
16.          }
17.      }
18.      // Rename variables in X_filters and add to R_conditions
19.      foreach X_filter in X_filters
20.          R_conditions = cons(rewriteX(X_env, S, X_filter), R_conditions)
21.
22.      // Put conditions in disjunctive normal form, i.e., [[ Condition ]]
23.      R_disjuncts = to_DNF(R_conditions)
24.
25.      / Rename variables in X_template
26.      R_template = rewriteX(X_env, S, X_template)
27.
28.      R_blocks = [ ]
29.      // Construct new RXL block: solution conditions + RXL template
30.      foreach R_conjunct in R_disjuncts
31.          R_blocks = cons(new RXL(R_conjunct, R_template), R_blocks)
32.
33.      return RXL_blocks
34.  }
```

First, for each XML-QL variable X_v in X_block, it projects X_v's value from the solution tuple r_i. Its value is a view-tree element and an associated rule, whose head and body are projected in R_head and R_body, a list of conditions. Function makeCopy (line 13) assigns fresh variable names to all free variables in R_condition, i.e., those that do not occur in the rule's head. Function rewriteR (line 15) rewrites the new rule, using the variable mapping S. The new condition is added to the conjunctive conditions in R_conditions. Second, the function rewriteX (line 20) rewrites the XML-QL filters in X_filters and adds those to R_conditions. Third, the function to_DNF (line 22) puts the new conditions in disjunctive normal form. On line 23, rewriteX rewrites the XML-QL template to produce the new RXL template. Finally, one new RXL block is created for each list of conjuncts in R_disjuncts, and the union of all these blocks is returned.

The rewriteX and rewriteR functions in the composition algorithm of the rewrite function below line 14 replace XML-QL and RXL variables by their new names in S.

```
1.   // rewriteX rewrites XML-QL expression as RXL expression
2.   fun rewriteX(Env X_env, VarMap S, X_Expr E) {
3.       fun substX(E) {
4.           case E of
5.           Var(v) = lookupMap(S, v)
6.           Const(c) = new Const(c)
7.           Element(T, X) = new Element(T, mapList(substX, X))
8.           Relop(op, E1, E2) = new Relop(op, substX(E1), substX(E2))
9.           // Cases for all types of BoolExprs . . .
10.          // Recursively compose and rewrite nested XML-QL query
11.          NestedQuery(X-block) = new NestedQuery(compose(X_env, S, X_block))
12.      }
13.      return substX(E)
14.  }
15.  // rewriteR renames RXL variables.
16.  fun rewriteR(S varmap, R_Expr E) {
17.      fun substR(E) {
18.          case E of
19.          Var(v) = lookupMap(S, v)
20.          TableExpr(name, vars) = new TableExpr(name, mapList(substR, vars))
21.          Filter(b) = new Filter(substR(b))
22.          Or(11, 12) = newOr(mapList(subst, 11), mapList(substR, 12))
23.          // Cases for all types of BoolExprs . . .
24.          NestedQuery(RXL(conditions, template)) =
25.              new NestedQuery(new RXL(mapList(substR, conditions), substR template))
26.      }
27.      return substR(E)
28.  }
```

The "helper" functions substX and substR perform the variable substitutions. Note that rewriteX calls compose recursively to rewrite a nested XML-QL block into an equivalent nested RXL block.

IV. Related Systems

BM's DB2 XML Extender provides a Data Access Definition (DAD) language that supports both composition of relational data in XML and decomposition of XML data into relational tables. DAD's composition feature, like RXL, supports generation of arbitrary XML from relational data. Unlike RXL, the criteria for grouping elements is implicit in the DAD and DAD specifications cannot be nested arbitrarily. More significantly, XML Extender does not support query composition, however, DAD could be used as a view-definition language in a SilkRoute architecture.

V. General Discussion

SilkRoute is a general, dynamic, and efficient framework for viewing and querying relational data in XML. SilkRoute is an XML-export tool that can support arbitrarily complex, virtual views of relational data and support XML user queries over virtual views. The ability to support arbitrary views is critical in data exchange between inter-enterprise applications, which must abide by public XML schemas and cannot reveal the underlying schemas of their proprietary data. SilkRoute has many benefits. For example, the fragment of the relational data requested by a user query need only be materialized; that requested data can be produced on demand; and the relational engine can perform most of the computation efficiently.

SilkRoute has one translation strategy, which generates one SQL query for each RXL sub query, which must be in disjunctive-normal form (DNF). In practice, RXL view queries can be arbitrary boolean combinations of table and filter expressions; for example, parallel RXL blocks often construct parts of complex elements independently, i.e., they express unions. User queries over such views often produce composed queries with many unions. Any RXL sub-query can be normalized into multiple sub-queries in DNF, which can result in a quadratic increase in the number of sub-queries to evaluate. In practice, multiple queries in DNF can be translated directly into SQL, for example, by using SQL's union-join constructs. Similarly, nested RXL queries often express left outer joins, e.g., the parent sub-query is the left relation and the child sub-query is the right relation. Two SQL queries can be generated, one for parent and child, but one SQL query suffices. In addition to reducing the number of SQL queries, each individual RXL sub-query can be minimized, i.e., redundant expressions can be eliminated, so that the resulting SQL query is also minimal. Techniques exist for query minimization, but general algorithms are NP-complete. Heuristic algorithms are projected to be effective for RXL queries, because RXL's nested block structure can help identify those expressions that most likely are redundant. XML-QL and SilkRoute can be implemented in Java. SilkRoute has drivers for Oracle and MySQL database servers.

VI. XML View-evaluation

Several illustrative embodiments of the present invention address the problem of evaluating efficiently an XML view in the context of SilkRoute, a relational to XML middleware system in SilkRoute. A relational to XML view can be specified in the declarative query language RXL. An RXL query has constructs for data extraction and for XML generation.

One aspect of the present invention involves materializing large RXL views. In practice, large, materialized views may be atypical: often the XML view is kept virtual, and users' queries extract small fragments of the entire XML view as described above in section I. In one implementation of the present invention, data-export or warehousing applications, which require a unique, large XML view of the entire database can be supported. In this case, computing the XML view may be costly, ranging from minutes to several hours, and query optimization can yield dramatic improvements.

In the article "Efficiently Publishing Relational Data as XML Documents", VLDB 2000, pp. 65–76, by Shanmugasudaram et al., the authors evaluate experimentally a variety of approaches for publishing XML data in a relational query engine. In a data-warehousing scenario, the XML document defined by an RXL view typically exceeds the size of main memory. Therefore, the sorted, outer union approach described by Shanmugasudaram et al. is suitable for the data-warehousing scenario. The sorted, outer union approach constructs one large, SQL query from the view query; reads the SQL query's resulting tuple stream; and then adds XML tags. The SQL query includes several left-outer joins, which construct the atomic data values of the XML document. The left-outer join expressions are combined in outer unions. The resulting tuples are sorted by the XML element in which they occur, so that the XML tagging algorithm can execute in constant space. SilkRoute described above uses an approach, in which the view query is decomposed into multiple SQL queries that do not contain outer joins or outer unions. Each result is sorted to permit merging and tagging of the tuples in constant space. Such a scheme is referred to as a fully partitioned strategy.

Neither the sorted, outer union approach nor the fully partitioned strategy is optimal. This is surprising because the sorted outer-union approach generates only one SQL query, and therefore, has the greatest potential for optimization by the RDBMS. However, for complex RXL queries, the outer-union query is too large and complex for the target RDBMS to optimize effectively. The sorted, outer-union strategy produces a query that is slower than the queries produced by the fully partitioned strategy due to the inability of the RDBMS optimizer to handle a complex query. An optimal strategy generates multiple SQL queries, but less queries than the fully partitioned strategy. Thus, the optimal SQL queries may contain outer joins and outer unions. XML tagging still uses constant space, because it merges sorted tuple streams. A strategy generating less multiple SQL queries than the fully partitioned strategy executes 3 to 20 times faster than the sorted, outer-union and fully partitioned strategies.

Recognizing that the optimal strategy executed much faster than the other alternatives, illustrative embodiments of the present invention employ an algorithm for decomposing an RXL view query into an optimal set of SQL queries. In developing an algorithm, two issues were considered. First, the RXL view query can be very large, because it constructs an XML document and, therefore, it may be as complex as the output schema. Public XML schemas have up to several hundreds elements and several thousand attributes, therefore any program or query generating XML documents for those XML schemas will have a comparable complexity. Consequently, this rules out exhaustive-search strategies such as the dynamic-programming algorithm disclosed by P. Selinger et al. in "Access Path Selection in a Relational Database Management System", Proceedings of ACM SIGMOD Int'l Conf. on Management of Data, pp. 23–34. Second, the algorithm needs to function in a middle-ware system, and, therefore cannot rely on RDBMS-specific heuristics.

The present invention can provide a greedy optimization algorithm to address the XML view-evaluation problem. An exemplary algorithm according to the present invention decomposes a large query into a set of small queries, and for example, can decompose an RXL query into a set of SQL queries. The search algorithm is generally guided by query-cost and data-size estimates provided by the RDBMS. The algorithm can facilitate obtaining an optimal strategy on, for example, two RXL views of a TPC-H (Transaction Processing Performance Council ad-hoc decision support benchmark) database.

While an illustrative greedy optimization algorithm according to the present invention is primarily described herein as being implemented in a middleware system, it will be appreciated that the associated techniques can be applied in RDBMS engines that generate XML internally. Generating XML in an RDBMS engine is generally more efficient than external generation in a middleware system, because the binding cost, i.e., the cost of binding application variables to the tuples, dominates execution time. In an illustrative implementation of the present invention, a greedy optimization algorithm may be used as a preprocessing step, to split the XML-view query into multiple SQL queries of manageable size that can be optimized by the RDBMS.

A greedy optimization algorithm according to the present invention is best adapted to scenarios where publishing large XML documents is necessary. In other scenarios, a user query may request only a subset of the XML view, where the resulting document is small. For example, a user may ask for all orders of customer "Smith" placed in "October, 2000". In this instance, the resulting XML document is much smaller than the XML view containing, for example, all customers and their orders. The scenario described above in section I can effectively handle subsets of the XML view. According to the scenario described above, the XML view of the database is virtual, and the user query being employed is an XML-QL user query.

In forming an algorithm, it is necessary to consider the search space for the XML view definition. In a large scale XML publishing scenario, the query strategy should scale to arbitrary large XML outputs, and it should be decoupled from a relational engine's query optimizer. Shanmgasundaram et al. considered strategies without these restrictions, and found two to be effective, the unordered outer union strategy and the CLOB De-correlated queries. In the unordered outer union strategy, the tagger uses a main memory hash table to assemble the XML objects, which requires the XML view fit in main memory. In CLOB De-correlated queries, the XML result is constructed by the relational engine, which is also effective when the XML view fits in main memory. Despite the effectiveness of these two strategies, it has been discovered in connection with the present invention that the sorted outer union strategy is more effective as query complexity and result size increase.

VII. RXL Query Example

An illustrative implementation of the RXL query language is provided in this section. As an illustrative database, the TPC Benchmark™ H (TPC-H) database (see www.tpc.org), which contains information about parts, the suppliers of those parts, customers, and their part orders, will be used. An illustrative fragment of the database's schema specified in datalog syntax is provided.

```
Supplier(*suppkey, name, address, nationkey)
Partsupp(*partkey, suppkey, availqty)
Part(*partkey, name, mfgr, brand, size, retailprice)
Customer (*custkey, name, address, nationkey, phone)
LineItem(*orderkey, partkey, suppkey, lineno, qty, price)
```

-continued

```
Orders(*orderkey, custkey, status, price, date)
Nation(*nationkey, name, regionkey)
Region(*regionkey, name)
```

Key attributes are denoted by the '*' prefix. For example, the Supplier relation has four attributes and its key is the suppkey attribute.

It is assumed assume that information in the TPC database needs to be exported in the format determined by the DTD below.

```
<?xml encoding="US-ASCII"?>
<!ELEMENT suppliers (supplier*)>
<!ELEMENT supplier (name, nation, region, part*)>
<!ATTLIST supplier ID ID>
<!ELEMENT name        (#PCDATA)>
<!ELEMENT nation      (#PCDATA)>
<!ELEMENT region      (#PCDATA)>
<!ELEMENT part        (name, order*)>
<!ATTLIST part        ID ID>
<!ELEMENT order       (orderkey, customer, cnation)>
<!ATTLIST order       ID ID>
<!ELEMENT orderkey    (#PCDATA)>
<!ELEMENT customer    (#PCDATA)>
```

This DTD specifies the XML format for the entire contents of the TPC database for the purpose of, for example, data warehousing. Each supplier element includes its name, its nation, the geographical region of the nation, and a list of the supplier's parts. Each part element includes a part name and a list of orders pending for the part. Each order element includes an orderkey, the associated customer, and the customer's nation. The name, nation, region, and customer elements all contain strings.

To keep the example simple, a DTD that follows naturally from the relational schema has been designed. Although it should be understood that in practice, this may not be the case. DTDs are created by agreement between partners, for the purpose of data exchange, and generally do not match each partners relational schema exactly. The DTD is also not unique. For example, a different DTD might be specified by a public consortium of parts suppliers to provide access to order information for their customers. These requirements rule out automatic generation of the DTD or of the mapping between the relational schema and the DTD.

An RXL query mapping the relational data to an XML output that is valid with respect to the DTD is shown below, and more particularly, an RXL view query of TPC-H Database, which may also be referred to as Query 1 herein.

```
from Supplier $s
construct
    <supplier><name>$s.name</name>
        {   from Nation $n
            where $s.nationkey = $n.nationkey
            construct <nation>$n.name</nation>
                { from Region $r
                    where $n.regionkey = $r.regionkey
                    construct <region>$r.name</region>
                }
        }
```

```
{   from Partsupp $ps, Part $p
    where   $s.suppkey $ps.suppkey,
            $ps.partkey = $p.partkey
    construct
        <part><name>$p.name</name>
            {   from LineItem $1, orders $o
                where   $ps.partkey = $1.partkey,
                        $ps.suppkey = $1.suppkey,
                        $1.orderkey = $o.orderkey
                construct
                    <order><orderkey>$o.orderkey</orderkey>
                        {   from Customer $c
                            where $o.custkey = $c.custkey
                            construct <customer>$c.name</customer>
                                ∴  from Nation $n2
                                    where $c.nationkey = $n2.nationkey
                            construct <cnation>$n2#name</cnation>
                        }
                    }
                </order>
            }
        </part>
    }
</supplier>
```

As in SQL, the from clause declares tuple variables that iterate over tables. In this example, $s is a tuple variable that iterates over the Supplier table. The where clause contains conditions over these variables: for example $s.nationkey= $n.nationkey is a join condition. The construct clause specifies an XML fragment that may contain expressions over the tuple variables.

Three features in RXL make it possible to create arbitrarily complex XML structures: nested queries, Skolem functions, and block structure. Nested queries occur inside construct clauses to construct sets of sub-elements. The block structure permits independent sub-queries to construct different sets of elements, i.e., parallel blocks express unions. For example, the outermost query above has two sub-queries delimited by block boundaries {. . . }, each constructing a different set of elements. Skolem functions can be used to fuse objects constructed by different queries, which is especially useful in data integration.

To evaluate the RXL query computing the XML view, one or more SQL queries need to be computed to extract and group the data for the XML view and then add the XML tags. Each sub-query in the view definition corresponds to an SQL query, but they are correlated, and it is unclear how to put them together. To illustrate, the simpler RXL query used in FIG. 4 shows a fragment of the above-defined query.

```
from Supplier $s
construct
    <supplier>
    {
    from Nation $n
    where $s.nationkey = $n.nationkey
    construct <nation>$n.name</nation>
    }
    {
    from Partsupp $ps, Part $p
    where $s.suppkey = $ps.suppkey, $ps.partkey = $p.partkey
    construct <part>name=$p.name/>
    }
    </supplier>
```

The set of all possible choices are best visualized on the intermediate representation for RXL queries, which is called a view tree. FIG. 3 depicts a view tree for the above-simplified RXL query. Each node corresponds to an element in one of the construct clauses in the RXL query, and is annotated by a non-recursive datalog query that computes all instances of that node in the output XML. From the queries, it is possible to derive the multiplicities of the parent/child relationships, which are indicated by the labels 1 and *, with obvious meaning. For example, in FIG. 3, the 1 between <supplier> and <nation> indicates that each <supplier> element in the output XML document will have exactly one child of type <nation>, and the * between <supplier> and <part> means that <supplier> may have arbitrarily many children of type <part>.

The view tree makes it clear how to generate queries. A '1'-labeled edge requires an inner join, while a * requires a left outer join. Hence, the view tree leads to the following SQL query:

```
select s.suppkey, n.name, SubQuery.partkey, SubQuery.name
from Supplier s, Nation n
where s.nationkey = n.nationkey
left outer join
    (select ps.suppkey as suppkey, p.name as pname
    from PartSupp ps, Part p
    where ps.partkey = p.partkey)
    as SubQuery
on s.suppkey = SubQuery.suppkey
order by s.suppkey
```

An outer join is needed because there could be suppliers without parts, and they need to appear in the XML document. The order by clause groups tuples from the same supplier together and allows the tagger to construct the <supplier> element using little main memory.

The above query may be referred to as a "unified" translation, because it corresponds to the entire view tree and produces one relation. It is equivalent to a sorted outer union query described in J. Shanmugasundaram et al., "Efficiently Publishing Relational Data as XML Documents" VLDB 2000, pp. 65–76. Also, the view tree can be split into connected components, and generate a separate SQL query for each such component. FIG. 4 provides an illustrative execution for systematically splitting the view tree into connected components. Execution plan (a) corresponds to the query above, while execution plans (b), (c), and (d) are three alternative ways to partition the view tree into connected components. Each execution plan produces a set of SQL queries. For example, execution plan (b) results in the two SQL queries:

```
select      s.suppkey, n.name
from        Supplier s, Nation n
where       s.nationkey n.nationkey
order by s.suppkey
select s.suppkey, p.name
from Supplier s, Part p, Partsupp ps
where s.suppkey ps.suppkey and ps.partkey = p.partkey
order by s.suppkey
```

Notably, no outer join is needed, because the first query produces all the values for Supplier. The tagger must merge the two sorted tuple streams to produce the XML elements. For execution plan(c) in FIG. 4, the queries are:

```
select      s.suppkey, n.name
from        Supplier s, Nation n
where       s.nationkey = n.nationkey
order by s.suppkey
select      s.suppkey, SubQuery.partkey, SubQuery.pname
from        Supplier s
left outerjoin
    (select ps.suppkey as suppkey, p.name as pname
    from PartSupp ps, Part p
    where ps.partkey = p.partkey)
    as SubQuery
on s.suppkey = SubQuery.suppkey
order by s.suppkey
```

Execution plan (d) in FIG. 4 corresponds to three SQL queries, which have been omitted for convenience, but will be readily apparent to those skilled in the art.

Figure 5:
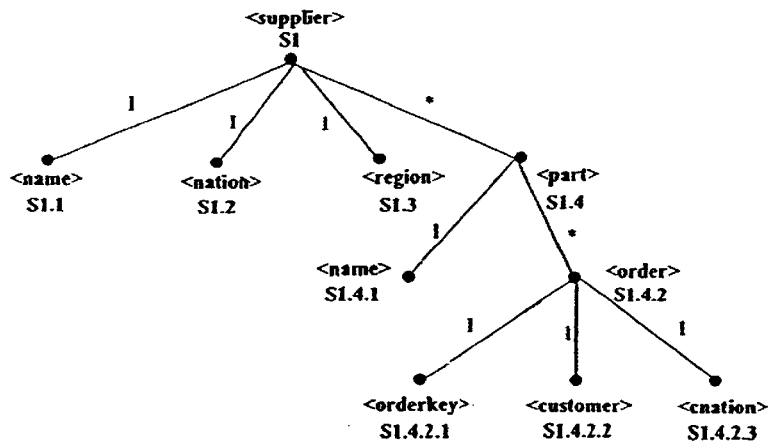
FIG. 5 depicts an illustrative view tree for a large RXL query (Query 1) according to the present invention.

FIG. 5 depicts the view tree for the large RXL query (Query 1) described above. In this view tree, there are nine edges and $2^9$ or 512 subsets of edges, each of which corresponds to a partition of the tree. Therefore there are 512 possible plans for splitting the tree into a collection of SQL queries; each plan including between 1 and 10 tuple streams. On a TPC/H database of 100 MB, some running times were tested:

```
10 queries: 1794s (569s)
5 queries: 589s (244s)
1 query: timed out after 1000 seconds
```

The first number is total execution time, which includes the time to execute the query at the server and to bind and transfer the data to RXL; the number in parentheses includes only the query time. The first line represents a plan that splits the query into ten small SQL queries, having sorted tuple streams that are merged by the tagger. The second line shows the best plan: it includes five SQL queries. In this case, the tagger has to merge five tuple streams. The plan on the last line is unified translation, i.e., a single SQL query.

The two "extreme" plans performed poorly, but the optimal plan is order of magnitudes better than the fully partitioned plan, which one might expect to perform well. Also, several other plans, including 3, 4, and 6 SQL queries respectively, performed almost as well as the optimal plan: under 600 s (246 s).

In general, there are $2^{|E|}$ possible translations of an RXL query into one or more SQL queries, where |E| is the number of edges in the query's corresponding view tree. Given the exponential number of potential plans, SilkRoute uses heuristics to choose a good plan. Those heuristics are described later herein.

In commercial XML middle-ware products, the user typically must write these SQL queries, which effectively "hard wires" the evaluation plan into the definition of the XML view. This may seem like a reasonable requirement, but in practice, it is difficult to choose a good plan. The simplest choices are to always produce one unified relation as in execution plan (a) in FIG. 4 or fully partitioned relations as in execution plan (d) in FIG. 4. However, as will be described later here, the unified and fully partitioned plans are often substantially slower than the optimal plans.

VIII. Plan Generation

Figure 6:
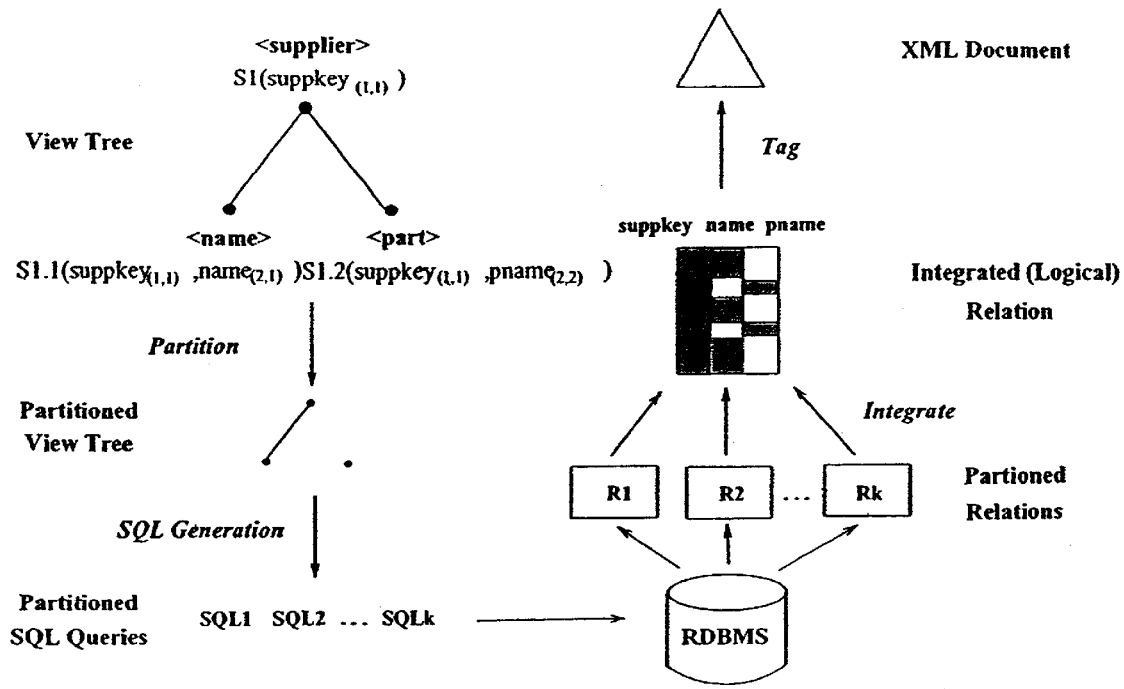
FIG. 6 depicts an illustrative architecture for a query planner and translator according to the present invention.

Below, a formal definition of a view tree is provided and the algorithm for translating a partitioned view tree into one or more SQL queries is described. FIG. 6 depicts the architecture of an illustrative query planner and translator. The planner partitions a view tree into one or more subtrees; for each subtree, one SQL query is generated. The translator submits the SQL queries to the underlying RDBMS, reads in the result relations, and constructs one integrated (logical) relation. A tuple in the integrated relation represents a path from the root element to a leaf element in the result XML document. The XML document is constructed by re-nesting the tuples in the result relation and tagging each element.

A. View Tree

An RXL view query V is represented by a view tree, which includes a global XML template and a set of datalog rules. The global XML template can be obtained by merging all the view query V's XML templates from all its construct clauses. Every XML template has an associated Skolem term that uniquely identifies the XML template in an RXL view. The user may assign a Skolem term explicitly to a template in the view query, or if absent, SilkRoute assigns a term. Elements from two different XML templates are merged if and only if they have the same Skolem function, hence each Skolem function occurs exactly once in the view tree. For example, the tree in FIG. 3 represents the global XML template for the RXL view query fragment described above. The Skolem terms $S1(suppkey_{(1,1)})$, $S1.1(suppkey_{(1,1)}, name_{(2,1)})$, $S1.2(suppkey_{(1,1)}, pname_{(2,2)})$ uniquely identify the supplier, nation, and part elements, respectively. The XML generator for SilkRoute uses the XML template to instantiate the result document.

A view tree's datalog rules are non-recursive. Their heads are Skolem terms, and their bodies include relation names and filters. The datalog rules are constructed as follows. For each occurrence of a Skolem function F in view query V, one rule of the form: F(x, y, . . . ):-body, where body is the conjunction of all from and where clauses in the scope where F occurs can be constructed. When a rule is associated with a Skolem term, the rule guards that Skolem term and its corresponding XML element. In both the XML template and in the datalog rules, the tuple variables used in RXL by column variables can be replaced. The head of a datalog rule corresponds to an element in the global XML template, and the body of a rule defines the conditions under which the element is created.

When assigning a Skolem term to a node, a Skolem-function index is associated with each Skolem function and a Skolem-term variable index is associated with each Skolem variable. A Skolem-function index uniquely defines the tag and location of a node. These indices are used to sort the tuples of partitioned relations during tagging of the XML document. A Skolem-function index $(l_1, l_2 \ldots)$ is assigned to each node in breadth-first order. For example, the Skolem function S1 is assigned to the root, and S1.1 is assigned to the root's first child. Each Skolem-term variable v is assigned a Skolem-term variable index (p, q) as follows. Let $n_v$ be the node closest to the root that has v in its Skolem term. Then, p is equal to the level of $n_v$ in the view tree, and q is the first integer such that (p, q) is unique for all variables in the tree. For example, the variable suppkey$_{(1,1)}$ is assigned index (1,1), because its containing element is at level one, and it is the first variable in the term. Similarly, the variable name.$_{(2,1)}$ is assigned index (2,1), because it is the first variable that appears in a term at level two. Finally, the variable pname$_{(2,2)}$ is assigned (2,2), because it is the second variable that appears in a term at level two.

B. View-tree Partitioning

As described in section VII, the planner produces one plan for each spanning forest of the view tree, so it produces $2^{|E|}$ plans, where |E| is the number of edges in the view tree. For example, given the view tree for Fragment 1 in FIG. 3, possible plans are shown in FIG. 4. The planner produces one SQL query for each tree in a spanning forest. In section V, a greedy algorithm is presented that heuristically chooses a small subset of the $2^{|E|}$ plans.

For each tree in a spanning forest, the schema of the relational relation that computes the nodes in the tree needs to be defined. To illustrate, consider the unified execution plan (a) in FIG. 4 that corresponds to the entire view tree. Given the example fragment of TPC-H database instance,

```
Supplier(supp#1, "USA Metalworks", "New York", usa#24)
Supplier(supp#2, "Romana Fspanola", "Madrid", spain#3)
Supplier(supp#3, "Fonderie Francais", "Paris", france#19)
Nation(usa#24, "USA", reg#1)
Nation(japan#3, "Spain", reg#2)
Nation(rom#19, "France", reg#3)
PartSupp(part#4, supp#1, 100)
PartSupp(part#12, supp#1, 320)
PartSupp(part#20, supp#3, 64)
Part(part#4, "plated brass", mfgr#3, "Brand1", "S", 904.00)
Part(part#12, "anodized steel", mfgr#4, "Brand2", "M", 912.01)
Part(part#20, "polished nickel", mfgr#1 , "Brand3", "L", 920.02)
``` the corresponding query produces a fragment of an XML document such as:

```
<supplier key="supp#1">
    <nation>USA</nation>
    <part>plated brass</part>
    <part>anodized steel</part>
</supplier>
<supplier key="supp#2">
    <nation>Spain</nation>
</supplier>
<supplier key="supp#3">
    <nation>France</nation>
    <part>polished nickel</part>
</supplier>
```

The result of the SQL query is the relation for plan (a) in FIG. 4 below:

| $L_1$ | $L_2$ | s.suppkey$_{(1,1)}$ | n.name$_{(2,1)}$ | p.name$_{(2,2)}$ |
|---|---|---|---|---|
| 1 | 1 | supp#1 | USA | |
| 1 | 2 | supp#1 | | plated brass |
| 1 | 2 | supp#1 | | anodized steel |
| 1 | 1 | supp#2 | Spain | |
| 1 | 1 | supp#3 | France | |
| 1 | 2 | supp#3 | | polished nickel |

In general, let $T_i$ be one spanning tree in a partitioned view tree T, and let SFI_maxlen($T_i$) be the maximum length of the Skolem-function indices in $T_i$. Let $R_i$ be the partitioned relation that corresponds to $T_i$. Then, the relational schema of $R_i$ is defined as attrs($R_i$)=SFI_attrs$_i$ U STV_attrs$_i$; where Skolem-function index attributes: SFI_attrs$_i$={"$L_j$"|1=j= SFI_maxlen(Ti)}, and Skolem-term variable attributes: STV_attr$_j$={v|v is a Skolem-term variable in $T_i$}.

To illustrate, FIG. 7 contains partitioned relations for all the execution plans in FIG. 4. The upper-left relation corresponds to the tree containing only the supplier node. Its Skolem-function index contains only one label $L_1$ and one Skolem-term variable suppkeyi$_{(1,1)}$. An instance of a partitioned relation I($R_i$) as follows. Let $V_{(p,q)}$ be a Skolem-term variable. Then, ($L_1$: $l_1$, . . . , $L_m$: $l_m$, $L_{m+1}$: $l_{m+1}$, . . . $L_{SFI\_maxlen(Ti)}$: $l_{SFI\_maxlen(Ti)}$, $V_{(p1, q1)}$: $v_{(p1, q1)}$, . . . , $V_{(pk,qk)}$: $V_{(pk,qk)}$)? I($R_i$) if and only if there is an element E in the result XML document that corresponds to a node in $T_i$, where ($l_1$ $l_2$ . . . $l_m$) is the Skolem-function index for E, and the Skolem-term variables for E are included in STV$_{attrj}$ and have non-null values for E.

The tuples in I($R_i$) are sorted by $L_1$, $V_{(1,1)}$ . . . , $V_{(1,n1)}$, $L_2$, $V_{(2,1)}$ . . . , $V_{(2,n2)}$, etc. This order is consistent with the structural relationship between the elements in the result XML document.

C. Integration and Tagging

In SilkRoute, the integrated relation is logical, namely, SilkRoute does not materialize the relation. Instead, the result XML document is constructed directly from the partitioned relations. An exemplary XML generation algorithm containing the integration and tagging algorithm is shown below:

Types:
Relation     A partitioned relation
Tuple        Tuple in the integrated relation ($L_1$, $V_{(1,1)}$ . . . , $V_{(1,n1)}$, . . . $L_m$, $V_{(m,1)}$ . . . , $V_{(m,nm)}$)
Tag          Set of tags
SFI          A Skolem-function index ($l_1$, . . . , $l_m$)
STV          A Skolem-term variable value ($v_{(1,1)}$, . . . , $v_{(1,n1)}$, . . . , $v_{(m,1)}$, . . . $v_{(m,nm)}$)
Functions and procedures:
getTuple: {Relation} ? Tuple           Returns the next tuple from the integrated relation
getTag: SFI ? Tag                      Returns the tag associated with a Skolem-function index
getSFI: Tuple ? SFI                    Projects the Skolem-function index values from a tuple
getValues: Tuple ? STV                 Projects the Skolem-term variable values from a tuple
getLeaf: Tuple x SFI ? String|null     Returns the leaf (atomic) string value associated with a
                                       Skolem-term, or null if it has no atomic value
SAXWriter                              An implementation of a SAX Writer -continued

```
EmitXML                    Emits tags and values for a given tuple
generateXML                Given partitioned relations, generates result XML Output:
                           An XML document
procedure generateXML(Relations: {Relation}) {
    SAXWriter.startDocument( )
    // Initialize all Skolem-function indices and Skolem-term values to null
    sfi' = (L_1: null, . . . , L_m: null)
    values' = (V_(1,1): null, . . . , V_(m,n): null)
    // Get next tuple from Relations in order (L_1, V_(1,1) . . . , V_(1,n1), . . . L_m, V_(m,1) . . . , V_(m,n))
    while ((tuple = getTuple(Relations)) != EOF) {
        sfi = getSFI(tuple)
        values = getValues(tuple)
        if(sfi' != sfi or values' != values) {
            // Get maximum index where new tuple and old tuple differ
            let l_1, . . . , l'_m = sfi'
                l_1, . . . , l_m = sfi
                n_1 = max{i|sfi.L_i = sfi'.L},
                n_2 = max{i|values.V_(ij) = values'.V_(ij)},
            in emitXML(m', min_(n1,n2)+1, m, tuple)
        }
        sfi' = sfi
        values' = values
    }
    SAXWriter.endDocument ( )
}
procedure emitXML(m', n, m, tuple)
    sfi = getSFI(tuple)
    // Close all open elements upto new element
    for (i=m'; i=n; i=i−1)
        SAXWriter.endElement(getTag(sfi.L_1 . . . sfi.L_i))
    // Open all containing elements upto new element
    for (i=n; i=m; i=i+1)
        SAXWriter.startElement(getTag(sfi.L_1, . . . , sfi.L_i))
        leafValue = getLeaf(sfi.L_1, . . . , sfi.L_i, tuple)
        if (leafValue != null) SAXWriter.characters (leaf Value)
    }
}
```

Intuitively, the integration and tagging algorithm merges the partitioned tuple streams into one tuple stream, nests the tuples, and tags their values.

An illustrative implementation of the integration and tagging algorithm according to the present invention includes several steps. These steps may include receiving one or more tuple streams each containing multiple tuples such that each tuple has a corresponding node index (e.g., Skolem term); comparing node indices of two tuples; and emitting an XML tag based on the result of the comparison.

Tuple streams may vary in width (i.e., contain differing numbers of fields). Therefore, the tuple streams may be logically integrated before the streams are compared. For example, if one tuple stream contains three fields, and another tuple stream contains 20 fields, the result of logically integrating the two tuple streams is one tuple stream that contains 23 fields and that is ordered by the tuple's node indices in document order. Each tuple in the integrated tuple stream is processed in order. The node index of the current tuple is then compared to the node index of the previous tuple to determine where the tuple's data belongs in the XML output document and what XML tag should be emitted. Node indices specify uniquely the level at which the tuple's data should appear in the XML output document. The algorithm compares the current node index to the previous node index, and an XML open or close tag is then emitted according to the difference in levels of the view tree between the two node indices. If the difference between the node indices is greater than one level of the view tree, more than one XML tag may be emitted. For example, if a tuple has the node index of 1.2 and a previous node index is 1.1.1, two XML close tags and one open tag would be emitted.

The integration and tagging algorithm can compare two node indices at a time. Once a node index is compared to the previous node index, the algorithm does not need to refer to the previous node again. Therefore, the required memory size of the algorithm can depend only on the number of nodes and Skolem-term variables in the view tree. It need not depend on the size of the database instance; therefore the algorithm scales well as the size of the underlying database, and corresponding XML document, can increase.

D. SQL Generation

SilkRoute uses outer-union plans, as described by J. Shanmugasundaram et al. in "Efficiently Publishing Relational Data as XML Documents", VLDB 2000, pp.65–76, to construct SQL queries for partitioned relations. The outer-union plans can be implemented using the 'with' clause and the outer-join and union operators of SQL. For example, one possible SQL query for execution plan (a) of FIG. 4) uses a left-outer join to combine the root (supplier) node with its children nodes, and it uses an outer union to combine the children nodes (the nation and part elements).

```
select 1 as L1, L2, s.suppkey, SubQuery.name, SubQuery.pname
from Supplier s
left outerjoin
```

```
((select 1 as L2, n.nationkey as nationkey, n.name as name, null as suppkey, null as pname
  from Nation n)
 union
 (select 2 as L2, null as nationkey, null as name, ps.suppkey as suppkey, p.name as pname
  from Partsupp ps, Part p
  where ps.partkey = p.partkey))
 as SubQuery
on (L2=1 and s.nationkey = SubQuery.nationkey) or (L2=2 and s.suppkey = SubQuery.suppkey)
sort by L1, s.suppkey, L2, SubQuery.nationkey, SubQuery.name, SubQuery.pname
```

The structure of outer-union plans using left-outer joins and unions corresponds closely to the structure of subtrees. The sub-query for a node n in a view tree and the sub-queries of n's children can be combined with an outer join. The sub-queries for n's children (siblings) can be combined with an outer union. The outer union is necessary because sibling nodes have different relational structures: in the relation that computes a node m, the attributes of m's siblings are null values. The SQL query above can be simplified further by view-tree reduction described in the next section.

Note that some of the plans SilkRoute produces do not require outer union, outer join, or the with clause. For example, a fully partitioned plan (i.e., with no edges) does not require any of these constructs. Plans with no branches (i.e., no sibling nodes) do not require the union operator. This characteristic is especially useful in a middle-ware system, because all SQL engines do not necessarily support all these constructs. In those cases, SilkRoute can choose permissible plans based on the source description of the underlying RDBMS.

E. View-tree Reduction

The view tree provides a flexible intermediate representation, because it supports generation of multiple execution plans. Its flexibility, however, can introduce redundant queries in the view tree and in corresponding execution plans. A single condition in an RXL query often guards the creation of multiple elements. For example, the part element and its sub-element name in the RXL view query of TPC-H database (Query 1) are both guarded by the condition $s.suppkey=$ps.suppkey, $ps.partkey=$p.partkey. In the corresponding view tree, however, the two elements are guarded by distinct, but equivalent, datalog rules. During plan generation, identifying "reducible" edges in the view tree can eliminate redundant queries. An edge is reducible if the queries associated with its nodes are equivalent, or if the query associated with a child node has a functional or inclusion dependency on the query of its parent node. In both cases, one query can be eliminated, because it is implied by the other. This reduces the number and complexity of queries in the final plan. The remainder of this section details view-tree reduction.

After generating a partitioned view tree, a planner can reduce the view tree in two steps. First, edges in the view tree can be assigned labels that indicate the potential number of child elements in the result XML instance. Second, groups of nodes connected by '1'-labeled edges, which represent functionally dependent queries, can be collapsed into one node by combining their queries. After view-tree reduction, SQL generation proceeds as described above in section D.

The labeling step using the view tree for Query 1 in FIG. 5. The edge labels '1', '?', '+' and '*', denote one, zero or one, one or more, and zero or more child elements, respectively. In FIG. 5, for each <supplier> element, its children include exactly one <name>, one <nation> and one <region> element, and zero or more <part> element(s).

An RXL query does not contain sufficient information to label edges, because the possible number of XML elements depends on the database instance. SilkRoute relies on the target database to provide the functional and inclusion dependencies. In the current implementation, the user can provide the database constraints in a source description file by hand. Alternatively, it will be appreciated by one skilled in the art that database constraints may be provided automatically or semi-automatically according to key constraints and referential constraints extracted from schema information of the underlying database. Given these inputs, SilkRoute labels the view tree edges as follows. Assume that p and c are the parent and child nodes of an edge e, where their queries are $F(x_1, \ldots, x_m):-Q_p$ and $G(x_1, \ldots, x_m, \ldots, x_n):-Q_c$, respectively. Let $R_p$ and $R_c$ be the relations defined by queries $Q_p$ and $Q_c$, i.e., $R_p=\{<x_1, \ldots x_m>|Q_p\}$ and $R_c=\{<x_1, \ldots, x_m, \ldots, x_n>|Q_c\}$. Then, edge e is labeled as follows:

|  |  | C1 | |
|---|---|---|---|
|  |  | True | False |
| C2 | True | 1 | + |
|  | False | ? | * |

Where
C1 is true if and only if there exists a functional dependency
$R_C: x_1, \ldots, x_m, ? x_{m+1}, \ldots, x_n$.
C2 is true if and only if there exists an inclusion dependency
$R_P[x_1, \ldots, x_m] \subset R_c[x_1, \ldots, x_m]$.
Note that the inverse of C2, $R_c[x_1, \ldots, x_m] \subset R_p[x_1, \ldots, x_m]$, always holds, because RXL's semantics always define a tree. Therefore, C2 implies $p_{x_1, \ldots, x_m}(Rc)=R_P$ in this context. In general, the problem of checking whether a given set of functional and inclusion dependencies implies another set of dependencies is indeterminate. SilkRoute uses heuristics and known algorithms for restricted problems. In particular, SilkRoute does not consider inclusion dependencies when it checks if a functional dependency can be derived, which allows the check to be done in linear time. This solution has been found to be adequate for typical RXL queries.

Figures 8, 9:
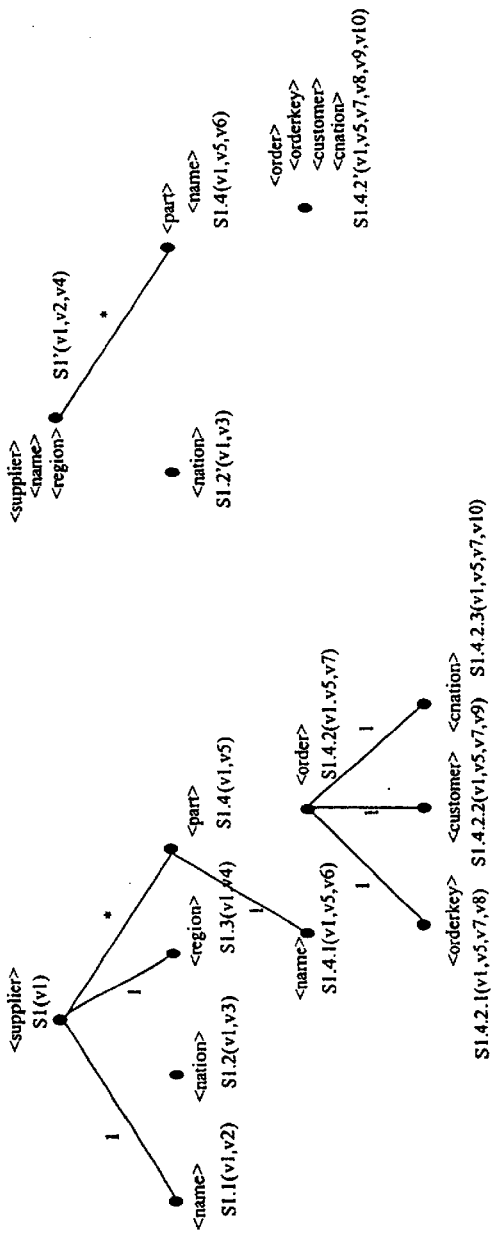
FIG. 8 shows an exemplary view tree reduction on the view tree of Query 1 in FIG. 5 according to the present invention.
FIG. 9 shows an RXL query (Query 2) of TPC-H database according to the present invention.

FIG. 8 illustrates the second step of view-tree reduction on the view tree in FIG. 5 of the RXL query (Query 1). The edges of the partitioned view tree are labeled. In Step 2, the nodes of the view tree are grouped into equivalence classes: each class contains nodes that are only reachable by '1'-labeled edges. For each such class, a new Skolein term S is created, and a new datalog rule $S(v_1, \ldots, v_m):-Q$ is created. The arguments of S, $v_1 \ldots v_m$, are the union of the Skolem-term arguments of each node in the class, and Q' is the conjunction of query bodies of all the nodes. In each class, the greatest-common-ancestor node is replaced by the new node $S(v_1, \ldots, v_m)$. For example, the equivalence classes in FIG. 8 are {S1, S1.1, S1.3}, {S1.4, S1.4.1}, and {S1.4.2, S1.4.2.1; S1.4.2.2, S1.4.2.3}. Each class is replaced by the nodes S1', S1.4', and S1.4.2', respectively.

Two illustrative potential benefits of view-tree reduction are that it can reduce the number of outer joins, which are typically expensive, and it can reduce the total size of the relations and therefore, the total size of data transferred. In general, whether view-tree reduction actually decreases the data size depends on the characteristics of submitted queries and database instances. For example, in FIG. 8, if the data size of <customer> element dominates, then in the reduced view tree, its large data value would occur in every tuple in the relation for S1.4.2', which could increase data-transfer time. It is not always the case, therefore, that the total time (i.e., both query-only time and data-transfer time) of a reduced plan is faster than the corresponding non-reduced plan. To alleviate this problem, the reduction of specific nodes can be prohibited based on the average data size estimated by the target database. Using view-tree reduction as a plan-improving heuristic: given a set of arbitrary non-reduced plans, the corresponding set of reduced plans, in general, are more efficient. In the next section, experimental results are presented that support this heuristic.

IX. Experiments

One important feature of a view tree is that it permits all possible execution plans for an RXL query to be generated and compared. As discussed in section V, other XML publishing systems produce either a unified or fully partitioned plan. In this section, these two default plans are compared to the "optimal" plans, i.e., those plans that have the fastest execution times compared to all others. Also plans generated from non-reduced view trees are compared with those generated from reduced view trees.

In addition to Query 1, plans for Query 2 are shown below. Immediately below is: Query 2 as an alternative RXL view query of TPC-H Database

```
from Supplier $s
    construct
    <supplier>
        <name>$s.name</name>
        {   from Nation $n
            where $s.nationkey = $n.nationkey
    construct <nation>$n.name</nation>
        {
            from Region $r
            where $n.regionkey = $r.regionkey
            construct <region>$r.name</region>
        }
{   from Partsupp $ps, Part $p
    where   $s.suppkey $ps.suppkey,
        $ps.partkey = $p.partkey
    construct
        <Part>
            <name>$p.name</name>
        </Part>
}
{   from PartSupp $ps2, Part $p2, LineItem $l2, Orders $o2
    where   $s.suppkey = $ps2.suppkey,
            $ps2.partkey = $p2.partkey,
            $ps2.partkey = $l2.partkey,
            $ps2.suppkey = $l2.suppkey,
            $l2.orderkey = $o2.orderkey
    construct
        <order>
            <orderkey>$o2.orderkey</orderkey>
            {   from Customer $c2
            where $o2.custkey = $c2.custkey
            construct
                <customer>$c2.name</customer>
                {   from Nation $n2
                    where $c2.nationkey = $n2.nationkey
                    construct
                        <cnation>$n2.name</cnation>
                }   }
        </order>
    }
</supplier>
```

FIG. 9 depicts a corresponding view tree for Query 2.

The easiest way to compare Query 1 and Query 2 queries is to compare their view trees in FIG. 5 and FIG. 9. Both trees have ten nodes and nine edges, the query expressions corresponding to each node are identical, but structurally, the trees differ. In Query 1, the two one-to-many edges (labeled "*"), are nested in a chain, whereas in Query 2, the two one-to-many edges are parallel. In Query 1, the first "*" edge connects one supplier element to many part elements, and the second "*" edge connects each part element to many order elements. In Query 2, the supplier element is connected to many part elements and also to many order elements. A one-to-many edge corresponds to a outer join in an SQL query, so each query stress an SQL engine in a different way: Query 1 would have nested outer joins and Query 2 would have unions of outerjoins.

The experiments run to compare Query 1 and Query 2 used two database configurations, which appear in Table 1 below. Configuration A used the TPC-H Database with 1 MB of data, and Configuration B used a 100 MB database. In these experiments, the database client was a simple Java program that submitted SQL queries to the database server and read tuples from the tuple streams using a JDBC interface.

TABLE 1

Configurations of Experimental Database

| Configure | Database Server Size | Platform | O/S | Client Platform | O/S | Java | | |
|---|---|---|---|---|---|---|---|---|
| A | 1 MB | AMD K6-2 350 MHz 256 MB mem 1 GB swap | Linux RedHat 6.1 | SGI Challenge L 4 GB mem | | IRIX64 V6.5 | JDK 1.2.2 JDBC 1.2.2 | |
| B | 100 MB | Intel Celeron 566 MHz 256 MB mem 1 GB swap | Linux RedHat 6.2 | Intel Pentium III 192 MB mem | | Linux RedHat 6.1 | JDK 1.2.2 JDBC 1.2.2 | |

The view trees for Query 1 and Query 2 have nine edges. As described in section VIII, one plan is generated for each subset of edges in the view tree, so there are $2^9$ or 512 possible plans for Query 1 and Query 2. Each plan generates between one and ten SQL sub-queries, each of which produces one tuple stream.

Figure 10:
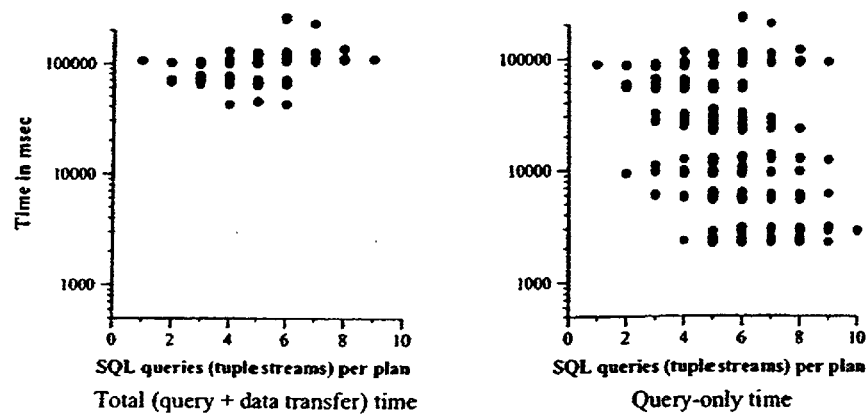
FIGS. 10 and 11 show a plot of all the execution plans for Query 1 and Query 2 according to the present invention.
Figure 11:
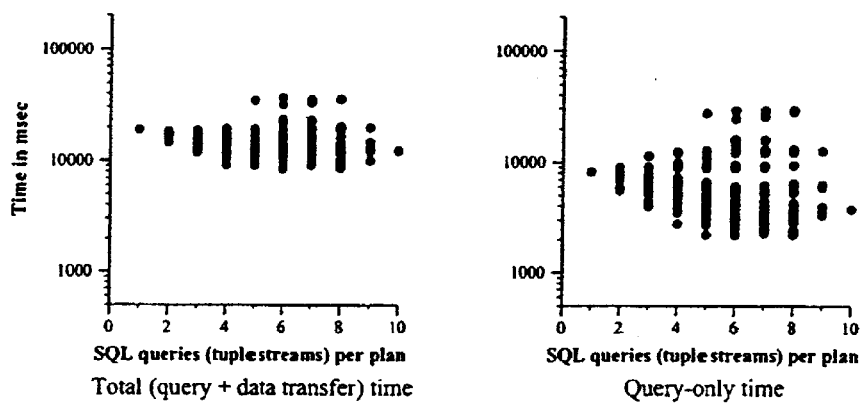

FIGS. 10 and 11 plot the execution times of all 512 plans for Query 1 and Query 2, respectively. The horizontal axis represents the number of tuple streams per plan and the vertical axis represents the execution time in milliseconds, on a log scale. Both total time and query-only time were measured on the SilkRoute client. Total time includes query execution time on the database server and data transfer time to the client: timing began when the first SQL query was submitted to the server and terminated when the last tuple was read from the last tuple stream. Query-only time includes the time until the first tuple is read from a tuple stream. If a sub-query did not complete within 5 minutes (Configuration A) or 1000 minutes (Configuration B), the entire plan was labeled "timed out" and no time was reported. Of the plans for Query 1, 102 plans timed out; of those for Query 2, no plans timed out.

From FIGS. 10 and 11, it can be seen that the optimal plans are significantly faster than both the unified and fully partitioned plans. For Query 1, the unified plan is 40 times slower than the optimal plan, but the fully partitioned plan is only 20 percent slower. In FIG. 11, the unified plan is more than 13 times slower than the optimal plan, and the fully partitioned plan is 40 percent slower.

Focusing on the total execution times, which includes data-transfer time, the differences are smaller, but still significant. For Query 1, the unified plan is 11 times slower than the optimal plan, and the fully partitioned plan is 38 percent slower. For Query 2, the unified plan is more than two times slower than optimal plan, and the fully partitioned plan is 45 percent slower. These results indicate that choosing the unified plan would most likely be unacceptable and that choosing the fully partitioned plan incurs a smaller, but measurable, time cost.

Figure 12:
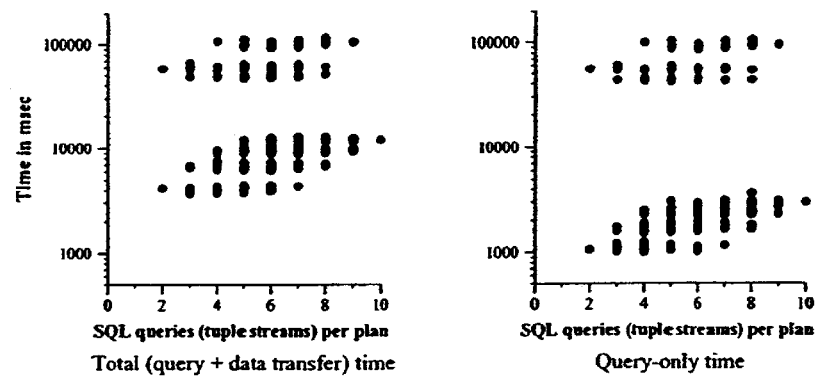
FIGS. 12 and 13 show the execution times of the plans with view-tree reduction for Query 1 and Query 2 according to the present invention.
Figure 13:
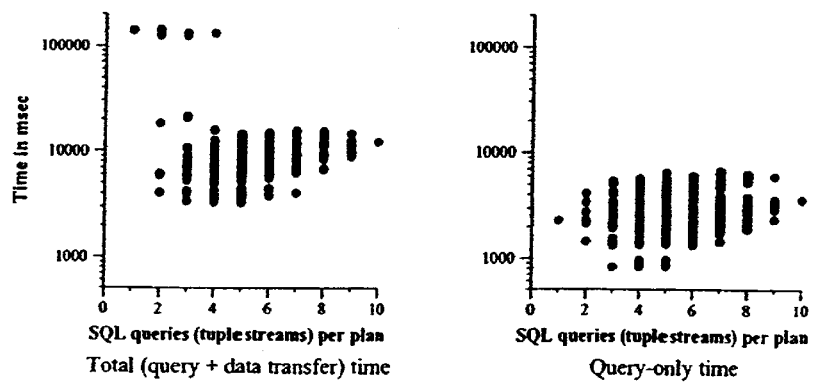

As discussed in section VIII, part E, view-tree reduction eliminates redundant queries in a view tree. To determine the effect of view-tree reduction on execution time, 512 plans were generated for Queries 1 and 2 and then applied the view-tree reduction algorithm to each plan. FIGS. 12 and 13 contain the execution times of the plans with view-tree reduction. FIG. 12 shows Query 1, Configuration A with view tree reduction and FIG. 13 shows Query 2, Configuration B with view tree reduction. These graphs should be compared to FIGS. 10 and 11, respectively.

Overall, view-tree reduction significantly reduces query-only and total-execution time. For both Queries 1 and 2, the ten fastest reduced plans are 2.5 times faster than the ten fastest non-reduced plans. Two anomalous cases exist. When view-tree reduction is applied to the unified plan for Query 1, the resulting query times out; the corresponding non-reduced plan is one of the slowest, but does not time out. The reduced plan contains two, nested, left-outer joins involving five relations, which may make it difficult for the target RDBMS' optimizer to produce a viable plan. For Query 2, view-tree reduction consistently reduces query-only time, but in several cases increases total execution time. As explained above, view-tree reduction can increase data size, which explains the increase in total execution time for Query 2.

In addition to reducing execution time, the optimal reduced plans are significantly faster than the fully partitioned reduced plans. For non-reduced trees, the fully partitioned plans were no more than 40 percent slower than the optimal plans, but for reduced trees, the fully partitioned plan for Query 1 was three times slower than optimal, and the fully partitioned plan for Query 2 was more than four times slower than optimal. These observations indicate that devising an algorithm to generate near-optimal plans is worthwhile.

X. Greedy, Plan-generation Algorithm

A conclusion drawn from the experiments discussed in section IX is that choosing a default unified, fully partitioned, or purely heuristic execution plan is not effective in practice. The only reliable source of information on query costs is the target RDBMs. Given that the target RDBMs can estimate the cost of a query, the target database can be used as an "oracle" to choose "good" edges in a view tree, namely, edges whose two associated queries are less expensive to evaluate together than separately.

An illustrative implementation of the greedy algorithm according to the present invention includes several steps. These steps may include converting the executable query into a view tree having multiple nodes each of the nodes having a query; comparing the costs of two separate queries of adjacent nodes with the cost of a single query which is a combination of the separate queries; and selecting either the two separate queries or the single combined query based on minimum cost. The algorithm repeats until no combined query has a lower cost than the corresponding separate queries.

According to the present invention, an algorithm is provided that given a view tree returns an evaluation plan that contains a set of mandatory view-tree edges and a set of optional view-tree edges. The algorithm uses the RDBMs to estimate the relative cost of an edge in the view tree. For an edge $e=(sfi_1, sfi_2)$, where $sfi_1$, $sfi_2$ are the Skolem functions associated with the edge's parent and child nodes respectively, the sum of the costs of evaluating the queries associated with $sfi_1$ and $sfi_2$ to the cost of evaluating the two queries combined can be compared by applying a simple linear equation to estimate a query's cost:

$$\mathrm{cost}(q, a, b) = a * \mathrm{evaluation\_cost}(q) + b * \mathrm{data\_size}(q)$$

where $$\mathrm{data\_size} = f(|\mathrm{attrs}(q)| * \mathrm{cardinality}(q))$$

The coefficients a and b give relative weights to query evaluation cost and query data size, respectively. The target RDBMs serves as an oracle, providing the values for the functions evaluation-cost and cardinality. This technique is feasible, because most commercial databases provide support for estimating the evaluation cost of a query and the expected cardinality of a query's result.

Below is shown an illustrative greedy algorithm for plan-generation genPlan according to the invention.

Types:

| | |
|---|---|
| Edge = SFI × SFI | A view-tree edge is a pair of Skolem-function indices |
| Query = SFI × SVI × Body | A query is a Skolem-term and a body of relation names and filters |
| ViewTree = {Edge} × {Query} | A view tree contains a set of edges and a set of queries |
| Cost = Int × Edge × Query | The cost of an edge, the edge, and the query if the edge is collapsed |

Functions

| | |
|---|---|
| getquery : SFI × {Query} ? Query | |
| incidentEdge : E : {Edge} × e : Edge ? [Edge] | Returns edges in E incident to e |
| combinequeries : Query × Query × Edge ? Query | Combines two queries on a given edge into one query |
| addEdge : E : Edge × plan : Edge | Sorts edges in E by costs and adds qualifying edge to plan |
| genPlan : ViewTree × Int × Int × Int × Int ? {Edge} × {Edge} | Returns plan containing mandatory and optional edges |

```
function genPlan(ViewTree,t1,t2, a ,b) {
    function addEdge(Edges, Queries, ,mandE, optE) {
        // Compute relative cost of each edge in Edges
        costE : {Cost} = U
            for ei in Edges {
                let (sfi1, sfi2) = ei
                    q1 = getQuery(sfi1, Queries)
                    q2 = getQuery(sfi2, Queries)
                    q3 = combineQueries(q1, q2, ei)
                in (cost(qc) – (cost(q1) + cost(q2)), ei, qc)
            }
        // Sort edges by costs
        sortedE = sort costE
        // Greedily add "best" edge to plan
        (i, e, qc) = head(sortedE)
        if(i<t1 || i<t2) {
            let (sfiQ,svt9,body9)=qc
                // Add a to plan
                mandE' = if(i < t1) mandEU {e} else mandE
                optE' = if(i >= t1 && i < t2) optEU {e} else optE
                (sfi1, sfi2) = e
                // Remove edge a from Edges
                Edges' = Edges – {e}
                // Remove e's queries from Queries
                Queries' = (Queries – { getquery(sfi1, Queries) }) – { getQuery(sfiZ, Queries) }
                // Add combined query q~ to Queries
                Queries" = Queries' U {q~}
                // Remove edges incident to a from Edges
                incidentE = incidentEdge(Edges, e)
                Edges" = Edges' – incidentE
                // For each edge incident to e, add new edge that is
                // incident to combined node defined by query qc
                Edges'" = Edges" U
                    for i in incidentE {
                        let (sfi,,,sfi,,) = i in
                        if(s.--= sfi1 II sfi,.-= sfia) { (sfi9, sfi,,)
                        }
                        else { (sfiu,sfi9) }
                    }
            in addEdge(Edges'", Queries", mandE', optE)
        } else (mandE,optE)
    }
    let (Edges, Queries) = ViewTree
    in addEdge (Edges, Queries, { }, { })
}
```

The function genPlan takes a view tree ViewTree, the cost coefficients a and b described above, and two thresholds: $t_1$ is the maximum threshold for a mandatory edge and $t_2$ is the maximum threshold for an optional edge. The recursive function addEdge takes the current set of edges (Edges), the queries associated with those edges (Queries), and the current sets of mandatory and optional edges. On each recursive invocation, addEdge computes the relative costs of every edge $e_i$ in Edges:

$$\text{relativeCost} = \text{cost}(q_c) - (\text{cost}(q_1) + \text{cost}(q_2))$$

where $q_1$ and $q_2$ are the queries associated with $e_i$'s parent and child nodes, and $q_c$ is the result of combining $q_1$ and $q_2$. These costs are then sorted and addPlan considers the edge e with the smallest relative cost (i.e., the one with greatest combined benefit). If the relative cost of e is less than $t_1$, the maximum threshold of a mandatory edge, then e is added greedily to the mandatory edges of the plan. Similarly, if e's relative cost is less than $t_2$, it is added to the optional edges of the plan. The function addEdge greedily adds edges until no remaining edge is less than the mandatory or optional threshold.

The function combineQueries determines how to collapse two queries into one query based on the label of the edge in the view tree. As described in section VIII, part A, '1'-labeled edges correspond to inner joins and '*'-labeled edges to outer joins. In addition, combineQueries applies view-tree reduction to eligible edges.

The complexity of the function genPlan is $O(|Edges|^2)$, because addEdge recomputes the costs of every edge in the view tree on each recursive call. This is only necessary to recompute the costs of those edges incident to each edge e selected by addEdge. To simplify presentation of the algorithm, this definition can recompute all the edge costs on each invocation.

The plan-generation algorithm was tested by applying it twice to the view trees for Query 1 and Query 2. In one case, combineQueries did not apply view-tree reduction while in the second case view-tree reduction was applied. The generated plans for Query 1 appear in FIGS. 14(a)–(c) and the generated plans for Query 2 in FIGS. 15(a)–(c).

Notably, the generated plans correspond directly to the fastest plans measured in section IX. For Query 1, the plans generated from the non-reduced and reduced view trees correspond to the fastest 32 plans. For Query 2, the plans generated from the non-reduced view tree correspond to the fastest 32 plans, and the plans generated from the reduced view tree correspond to the first 31 and the 34th fastest plans.

Figure 16:
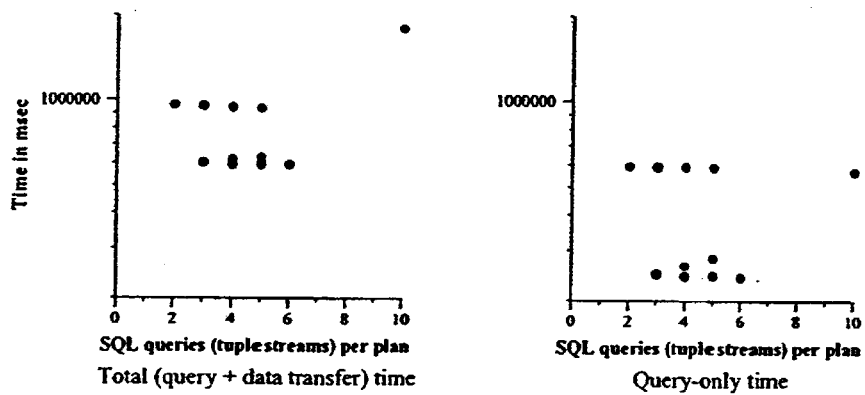
FIG. 16 shows a plot of the execution times for the sixteen plans of Query 1 in FIG. 14(c) and the unified and fully partitioned plans according to an illustrative implementation of the present invention.
Figure 17:
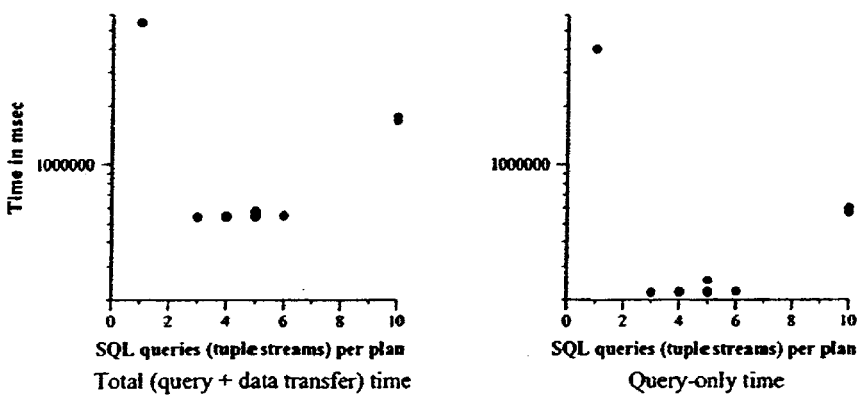
FIG. 17 shows a plot of the execution times for the eight plans of Query 2 in FIG. 15(c) an d th e unified and fully partitioned plans according to an illustrative implementation of the present invention.

The database in Configuration A contained 1 MB of data. In Configuration B, the size of the database was increased to 100 MB. In this configuration, it is not possible to exhaustively test all 512 plans. Instead, the greedy algorithm was tested using view-tree reduction and the generated plans were compared with the unified and fully partitioned plans. Sixteen plans were generated for Query 1 as shown in FIG. 14(c). FIG. 16 plots the execution times for these plans and the unified and fully partitioned plans. Eight plans were generated for Query 2, which appear in FIG. 15(c). The corresponding execution times are shown in FIG. 17.

Under Configuration B, the unified plan for Query 1 exceeded the 1000-second timeout limit. Eight of the generated plans were more than three times faster than the fully partitioned plan, and the other eight were more than 80 percent faster. For Query 2, the differences were even more significant. Specifically, the generated plans were consistently 10 times faster than the unified plan and three times faster than the fully partitioned plan. These results indicate that as the size of the XML view increases, generating optimal plans becomes imperative.

For all the plans generated, the same values were used for the coefficients a (100) and b (1) and the thresholds $t_1$ (−60000) and $t_2$ (6000), which indicates that the linear cost function depends primarily on the characteristics of the database environment, and not on the characteristics of the query.

The actual efficiency of the plan-generation algorithm can be evaluated. The complexity of the algorithm is $O(|Edges|^2)$ and that on each edge access, the algorithm requests the estimated costs of evaluation time and data size from the target database's query optimizer. For Queries 1 and 2, the actual number of database requests for query-cost estimates proved to be much smaller than the expected number of requests ($9^2$=81). Both Queries 1 and 2 required 22 requests for the non-reduced view tree and 25 requests for the reduced view tree.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed:

1. A method for converting relational data from a relational database into extensible markup language (XML) comprising steps of:

storing a view query that defines a XML view of the relational database;

receiving a user query to access XML data in the XML view of the relational database;

forming an executable query by determining a composition of the view query and the user query;

applying a greedy algorithm to the executable query to form a data extraction portion and an XML construction portion;

transmitting the data extraction portion to the relational database;

receiving at least one tuple stream from the relational database according to the data extraction portion; and merging the at least one tuple stream and the SML construction portion to generate an XML document, wherein the XML view is capable of defining a document of arbitrary nesting depth.

2. The method according to claim 1, wherein the user query is in XML-QL.

3. The method according to claim 2, wherein the view query is a RXL query.

4. The method according to claim 3, wherein the executable query is another RXL query.

5. The method device according to claim 1, wherein said step of receiving the user query includes receiving the user query from an application over a distributed network.

6. The method according to claim 1, wherein the data extraction portion includes at least one SQL query.

7. The method according to claim 6, wherein the XML construction portion is an XML template.

8. The method according to claim 6, wherein said step of receiving the at least one tuple stream includes receiving one tuple stream for each SQL-query included in the data extraction portion.

9. The method according to claim 1, wherein the step of applying a greedy algorithm to the executable query to form the data extraction portion and the XML construction portion includes the steps of:

converting the executable query into a view tree having plural nodes, each of the nodes having a query;

comparing queries of two adjacent nodes with a combination of the queries of the two adjacent nodes;

selecting either the queries of the two adjacent nodes or the combination of the queries of the two adjacent nodes based on cost; and repeating said comparing and said selecting of queries until no combination of queries of two adjacent nodes has a cost lower than a cost of the corresponding separate queries.

10. The method according to claim 1, wherein the step of merging the at least one tuple stream and the XML construction portion to generate an XML document includes applying an integration and tagging algorithm.

11. The method according to claim 10, wherein the step of applying an integration and tagging algorithm includes the steps of:
   receiving the at least one tuple stream, the at least one tuple stream having plural tuples with a corresponding node index for each tuple;
   comparing a node index of a first tuple with a node index of a second tuple; and
   emitting an XML tag based on said comparing.

12. A computer readable medium including a set of executable instructions stored thereon for converting relational data stored in a relational database into XML data, the set of instructions including:
   forming an executable query from a view query and a user query that defines an XML view of the relational database and a user query;
   applying a greedy algorithm to the executable query to forma a data extraction portion and an XML construction portion; and
   merging the at least one tuple stream and the SML construction portion to generate an XML document, wherein the XML view is capable of defining a document of arbitrary nesting depth.

13. The computer readable medium according to claim 12, wherein the view query is a RXL query.

14. The computer readable medium according to claim 13, wherein the executable query is another RXL query.

15. The computer readable medium according to claim 12, wherein the data extraction portion includes at least one SQL query.

16. The computer readable medium according to claim 15, wherein said step of receiving the at least one tuple stream includes retrieving one tuple stream for each SQL-query included in the data extraction portion.

17. The computer readable medium according to claim 12, wherein the step of applying a greedy algorithm to the executable query to form a data extraction portion and an XML construction portion includes the steps of:
   converting the executable query into a view tree having plural nodes, each of the nodes having a query;
   comparing queries of two adjacent nodes with a combination of the queries of the two adjacent nodes; and
   selecting either the queries of the two adjacent nodes or the combination of the queries of the two adjacent nodes based on cost.

18. The computer readable medium according to claim 12, wherein the step of merging the at least one tuple stream and the XML construction portion to generate an XML document includes applying an integration and tagging algorithm.

19. The computer readable medium according to claim 18, wherein the step of applying an integration and tagging algorithm includes the steps of:
   receiving the at least one tuple stream, the at least one tuple stream having plural tuples with a corresponding node index for each tuple;
   comparing a node index of a first tuple with a node index of a second tuple; and
   emitting an XML tag based on said comparing.

20. A computer system for converting relational data in a relational database into XML data, and said system comprising:
   a query composer module configured to form an executable query from a view query and a user query that defines an XML view of the relational data and a user query;
   a translator module coupled to the query composer module configured to receive the executable query, partition the executable query through the use of a greedy algorithm, and transmit the data extraction portion to a relational database;
   an XML generator module configured to receive the XML-construction portion from said translator module, receive at least one tuple stream from the relational database based on data extraction portion, and merge the at least one tuple stream and the XML-construction portion generate an XML document, wherein the XML view is capable of defining a document of arbitrary nesting depth.

21. The computer system according to claim 20, wherein said translator module receives a description of a schema of the relational data prior to partitioning the executable query.

22. The computer system according to claim 20, wherein the user query is in XML-QL, the view query is a RXL query and the executable query is another RXL query.

23. The computer system according to claim 20, wherein said query composer module is configured to receive the user query from an application over a distributed network.

24. The computer system according to claim 23, wherein said XML generator module is configured to transmit the XML document to the application over the distributed network.

25. The computer system according to claim 20, wherein the data extraction portion includes at least one SQL query.

26. The computer system according to claim 25, wherein said XML generator module receives one tuple stream for each SQL-query included in the data extraction portion.

27. The computer system according to claim 20, wherein the data extraction portion is executable by the relational database.

28. The computer system according to claim 20, wherein the query composer module includes
   a pattern matcher module configured to match patterns of the user query and the view query to obtain a solutions relation, in which each tuple represents a match; and
   a rewriter module configured to rewrite each tuple.

29. The computer system according to claim 20, wherein the XML generator module merges the at least one tuple stream and the XML construction portion to generate an XML document by applying an integration and tagging algorithm.

* * * * *